(12) United States Patent
Bielman et al.

(10) Patent No.: US 10,142,697 B2
(45) Date of Patent: Nov. 27, 2018

(54) ENHANCED INTERACTIVE TELEVISION EXPERIENCES

(71) Applicant: Microsoft Technology Licensing, LLC, Redmond, WA (US)

(72) Inventors: Tyler Bielman, Vancouver (CA); Helen Lam, Richmond (CA); Michelle Tze Hiang Chua, Vancouver (CA); Shannon Yen Yun Lee, Vancouver (CA); Matthew Nigel Carter, Port Coquitlam (CA); Matthew Davy Walsh, Delta (CA); David Seymour, Vancouver (CA); Preetinderpal S. Mangat, Surrey (CA); William Michael Mozell, North Vancouver (CA); Jesse William Wesson, Vancouver (CA); Michael James Mahar, Vancouver (CA); Raymond Alexander Chi-Yue Lum, Vancouver (CA); Michael James Perzel, Vancouver (CA); Cameron David James McRae, Port Coquitlam (CA); Darrin Adam Brown, Vancouver (CA); Dashan Yue, Vancouver (CA); Remus Radu, Port Moody (CA); Eric C. Bridgwater, Vancouver (CA); David T. Ferguson, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/563,294

(22) Filed: Dec. 8, 2014

(65) Prior Publication Data
US 2016/0066053 A1    Mar. 3, 2016

Related U.S. Application Data

(60) Provisional application No. 62/043,311, filed on Aug. 28, 2014.

(51) Int. Cl.
*H04N 21/482* (2011.01)
*H04N 21/431* (2011.01)
(Continued)

(52) U.S. Cl.
CPC ......... *H04N 21/482* (2013.01); *H04N 21/431* (2013.01); *H04N 21/4316* (2013.01);
(Continued)

(58) Field of Classification Search
CPC ............ H04N 21/482; H04N 21/4722; H04N 21/4312; H04N 21/4882; H04N 21/4316;
(Continued)

(56) References Cited

U.S. PATENT DOCUMENTS

| 7,735,101 B2 | 6/2010 | Lanza et al. |
| 8,375,407 B2 | 2/2013 | Tsuchida et al. |

(Continued)

FOREIGN PATENT DOCUMENTS

| EP | 2501144 A2 | 9/2012 |
| WO | 2014050733 A1 | 4/2014 |
| WO | 2014176471 A1 | 10/2014 |

OTHER PUBLICATIONS

Ferguson, et al., "Enhancing the Functionality of Interactive TV with Content-based Multimedia Analysis", In 11th IEEE International Symposium on Multimedia, Dec. 14, 2009, (6 pages total).
(Continued)

*Primary Examiner* — Pankaj Kumar
*Assistant Examiner* — Alexander Boyd
(74) *Attorney, Agent, or Firm* — Mark K. Young; Mayer & Williams PC

(57) ABSTRACT

Various enhanced interactive TV experiences are supported by a real-time TV service that can interact over a network with applications running on interactive TV platforms. The real-time television service enables data, video, and com-
(Continued)

munication user interface (UI) elements to be supported alongside the linear TV content in three discrete navigational states, each with a specific role aligning to user intent. In the case of one particular UI element—a focused companion panel—a live stream of personalized data is supported that enhances the user's comprehension and awareness of live events. The real-time TV service can further enable users to opt in to certain customizable events and be served notifications on the TV screen on which their attention is directed, and follow the notification into an application that lands them on a specific piece of content that satisfies specific conditions.

6 Claims, 20 Drawing Sheets

(51) Int. Cl.
  *H04N 21/488* (2011.01)
  *H04N 21/4722* (2011.01)
  *H04N 21/485* (2011.01)
  *H04N 21/41* (2011.01)

(52) U.S. Cl.
  CPC ..... *H04N 21/4722* (2013.01); *H04N 21/4858* (2013.01); *H04N 21/4882* (2013.01); *H04N 21/4122* (2013.01); *H04N 21/4312* (2013.01)

(58) Field of Classification Search
  CPC ............. H04N 21/4122; H04N 21/431; H04N 21/4858
  See application file for complete search history.

(56) References Cited

U.S. PATENT DOCUMENTS

| | | | |
|---|---|---|---|
| 8,705,195 B2 | 4/2014 | Lockton | |
| 2002/0040482 A1* | 4/2002 | Sextro | H04N 21/4312 725/136 |
| 2005/0262533 A1* | 11/2005 | Hart | H04N 21/4312 725/40 |
| 2007/0162850 A1* | 7/2007 | Adler | G06F 9/4443 715/700 |
| 2008/0263472 A1* | 10/2008 | Thukral | H04N 21/4316 715/774 |
| 2009/0089838 A1 | 4/2009 | Pino, Jr. et al. | |
| 2009/0293013 A1* | 11/2009 | O'Shaugnessy | G06F 3/04883 715/810 |
| 2010/0095326 A1 | 4/2010 | Robertson, III | |
| 2012/0162238 A1* | 6/2012 | Fleck | G09G 3/20 345/545 |
| 2012/0174157 A1 | 7/2012 | Stinson, III et al. | |
| 2012/0225693 A1* | 9/2012 | Sirpal | G06F 1/1616 455/566 |
| 2012/0324507 A1 | 12/2012 | Weber | |
| 2013/0139201 A1 | 5/2013 | Chane et al. | |
| 2013/0151603 A1* | 6/2013 | Lobb | A63F 13/12 709/204 |
| 2013/0262575 A1 | 10/2013 | Xiong et al. | |
| 2014/0149210 A1 | 5/2014 | Ma et al. | |
| 2015/0310521 A1* | 10/2015 | Isselhardt | G06Q 30/0621 705/26.5 |
| 2015/0331856 A1* | 11/2015 | Choi | G06F 17/30867 707/746 |
| 2016/0034238 A1* | 2/2016 | Gerlach | G06F 3/04817 345/1.1 |
| 2016/0055246 A1* | 2/2016 | Marcin | G06F 17/30867 707/732 |
| 2016/0055256 A1* | 2/2016 | Look | G06F 17/30893 715/205 |

OTHER PUBLICATIONS

Elkins, Chad., "Showtime SHO Sync Second Screen Experience", Published on: Aug. 31, 2013, Available at: http://the2ndscreen.tv/showtime-sho-sync-second-screen-experience/ (6 pages total).

"YouTube API v2.0—Retrieving Live Events", Published on: Jun. 4, 2012, Available at: https://developers.google.com/youtube/2.0/developers_guide_protocol_retrieving_live_events (6 pages total).

"6 best Smart TVs in the world 2014", Published on: Aug. 14, 2013, Available at: http://www.techradar.com/news/television/6-best-smart-tv-platforms-in-the-world-today-1120795 (12 pages total).

Koenig, Steve., "The Rise of TV's Second Screen", Published on: Mar. 25, 2014, Available at: http://www.ce.org/i3/Grow/2014/March-April/The-Rise-of-TV%E2%80%99s-Second-Screen.aspx (2 page total).

U.S. Appl. No. 61/816,691, Lam, et al., "Contextual Companion Panel", filed Apr. 26, 2013.

U.S. Appl. No. 61/818,422, Watson, et al., "Integrated Interactive Television Entertainment System", filed May 1, 2013.

U.S. Appl. No. 61/816,689, Hoang, et al., "Alert Overlay Over Linear Broadcast Triggering Relevant Interactive UI", filed Apr. 26, 2013.

"International Preliminary Report on Patentability Issued in PCT Application No. PCT/US2015/046619", dated Jul. 29, 2016, (5 Pages total).

"International Search Report & Written Opinion Issued in PCT Application No. PCT/US2015/046619", dated Nov. 10, 2015, (13 Pages total).

\* cited by examiner

ENHANCED INTERACTIVE TELEVISION EXPERIENCES

STATEMENT OF RELATED APPLICATION

This application claims the benefit of provisional patent application Ser. No. 62/043,311 entitled "Enhanced Interactive Television Experiences" filed Aug. 28, 2014.

BACKGROUND

Companion experiences for linear television (TV) content are generally limited to second screens like those supported by mobile and tablet devices. This often forces the user to divide attention between a big screen TV in front of him or her and a smaller screen in hand. Synchronicity between these devices plus the physical location of the screens can often create an unharmonious experience (i.e., the user wants the data, but is always missing something). In addition, when presented with a content distribution system and interface that is intended to occupy only partial attention from the user, the companion experiences are not currently designed in such a way as to be delicately disruptive and which can utilize reduced user input to attain and maintain a meaningful state.

Users can also face other issues with companion experiences. For example, TV-oriented activity space for any notifications of events happening in real time generally cannot be served directly to the TV screen with which the user is engaged. In most cases, notifications of live events are limited to second screen devices. Moreover, there is typically limited capability for following a notification into an interactive space on a TV related to the live event.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Various enhanced interactive TV experiences are supported by a real-time TV service that can interact over a network with applications running on interactive TV platforms such as multimedia consoles, personal computers (PCs) and the like. The real-time television service enables data, video, and communication user interface (UI) elements to be supported alongside the linear TV content in three discrete navigational states, each with a specific role aligning to user intent. In the case of one particular UI element—a focused companion panel—a live stream of personalized data is supported that enhances the user's comprehension and awareness of live events. When the interactive TV platform is operated in companion mode, the UI is organized in a manner that optimally deals with a user moving from full attention to partial attention states. The real-time TV service can determine what content to display and its organization, automatically update certain content, and support the movement between content elements in an easy and intuitive way. The real-time TV service can further enable users to opt in to certain customizable events that they care about, be served notifications on the TV screen on which their attention is directed, and then with a single button press, for example, follow the notification into an application that lands them on a specific piece of content that satisfies the specific conditions that they care about.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated. It is emphasized that the particular UIs displayed in the drawings can vary from what is shown according to the needs of a particular implementation.

DETAILED DESCRIPTION

Figure 1:
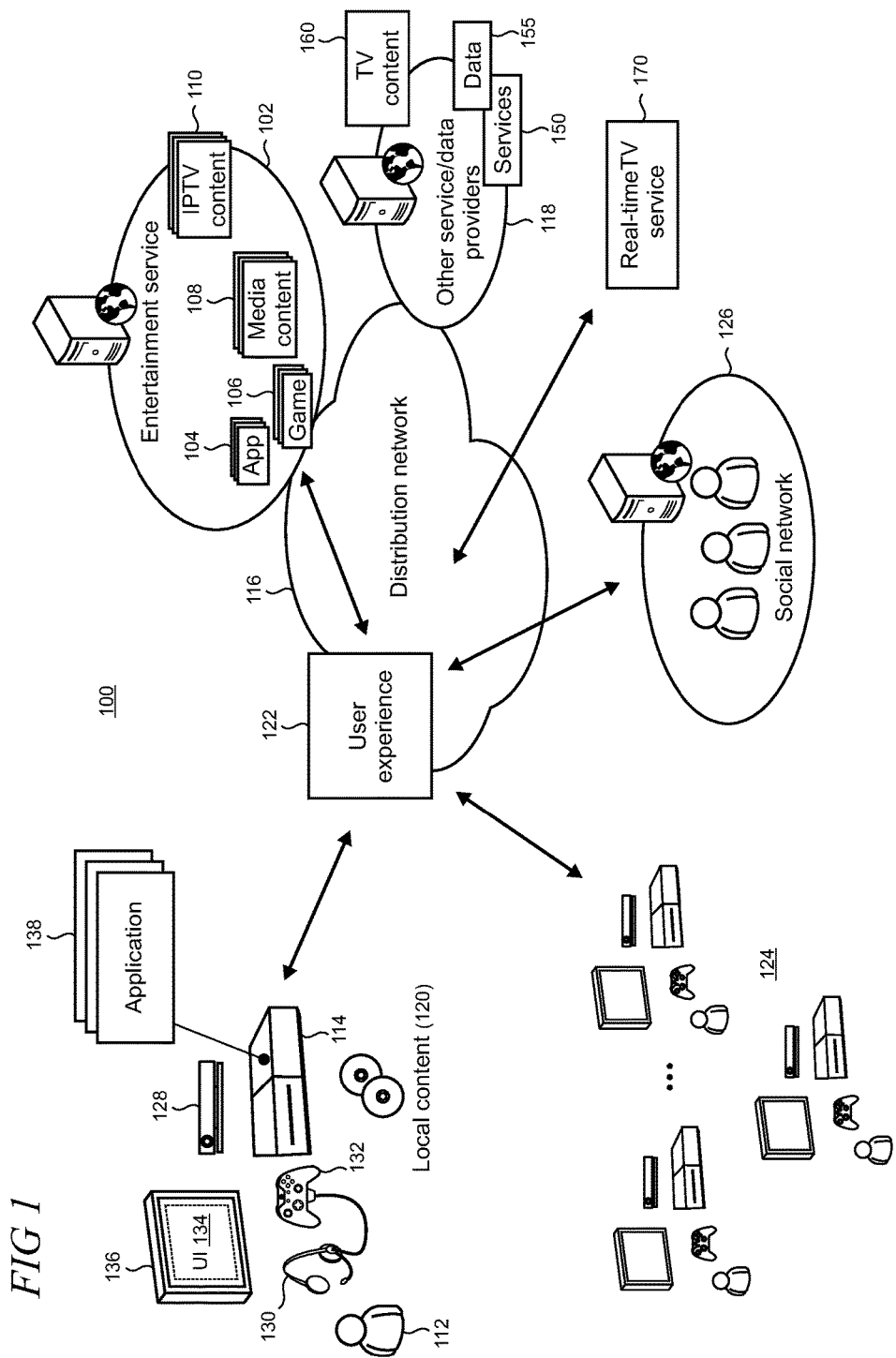
FIG. 1 shows an illustrative computing environment in which the present enhanced interactive TV experiences may be implemented.

FIG. 1 shows an illustrative computing environment 100 in which the present enhanced interactive TV experiences may be implemented. An entertainment service 102 typically can expose applications ("apps") 104, games 106, media content 108 such as television shows and movies, and streaming Internet Protocol Television ("IPTV") content 110 to a user 112 of a multimedia console 114 over a distribution network 116 which may include portions of one or more networks including public switched telephone networks (PSTN), mobile operator and cellular networks, Wi-Fi, local and/or wide area networks, short range networks, and the Internet. Other service/data providers (representatively indicated by reference numeral 118) that can provide various other services 150 such as communication services, financial services, travel services, news and information services, etc. may also be in the environment 100. The other service/data providers 118 may also provide data 155 and/or TV content in some cases.

Local content 120, including apps, games, and/or media content may also be utilized and/or consumed in order to provide a particular user experience 122 in the environment 100. In some cases the local content 120 is obtained from removable sources such as optical discs including DVDs (Digital Versatile Discs) and CDs (Compact Discs) while in others, the local content is downloaded from a remote source and saved locally. The user experience 122 may execute locally on the multimedia console 114, be hosted remotely by the entertainment service 102, or use a combination of local and remote execution in some cases using local or networked content/apps/games as appropriate. The user experience 122 may also be one in which multiple other players 124 with other computing devices can participate. In some implementations, a user experience can also be shared on a social network 126.

The user 112 can typically interact with the multimedia console 114 using a variety of different interface devices including a camera system 128 that can be used to sense visual commands, motions, and gestures, and a headset 130 or other type of microphone or audio capture device/system. In some cases a microphone and camera can be combined into a single device. The user 112 may also utilize a controller 132 to interact with the multimedia console 114. The controller 132 may include a variety of physical controls including joysticks, a directional pad ("D-pad"), and buttons. One or more triggers and/or bumpers (not shown) may also be incorporated into the controller 132. The user 112 will typically interact with a user interface 134 that is shown on a display device 136 such as a television or monitor.

Various applications 138 are supported on the multimedia console 114. The applications 138 are often implemented using locally executing code. However in some cases, the applications may rely on services and/or remote code execution provided by remote servers or other computing platforms. As described in more detail below, particular ones of the applications 138 can be configured to interoperate with a real-time TV service 170 to support various user experiences.

It is emphasized that the number of controls utilized and the features and functionalities supported by the user controls implemented in the camera system 128, audio capture system, and controller 132 can vary from what is shown in FIG. 1 according to the needs of a particular implementation. In addition, in the description that follows, various gestures, button presses, and control manipulations are described. It is noted that those actions are intended to be illustrative. For example, the user may actuate a particular button or control, or perform a particular gesture in order to prompt a system operating on the multimedia console 114 to perform a particular function or task. It will be appreciated that the particular mapping of controls to functions can vary from that described below according to the needs of a particular implementation. As used here, the term "system" encompasses the various software (including the software operating system ("OS")), hardware, and firmware components that are instantiated on the multimedia console and its peripheral devices in support of various user experiences that are provided by the console. Although the present enhanced interactive TV experiences are described in the illustrative examples herein using the context of a multimedia console, it is emphasized that other computing platforms such as PCs, laptops, tablets, and mobile devices may also be used in various alternative implementations.

Figure 2:
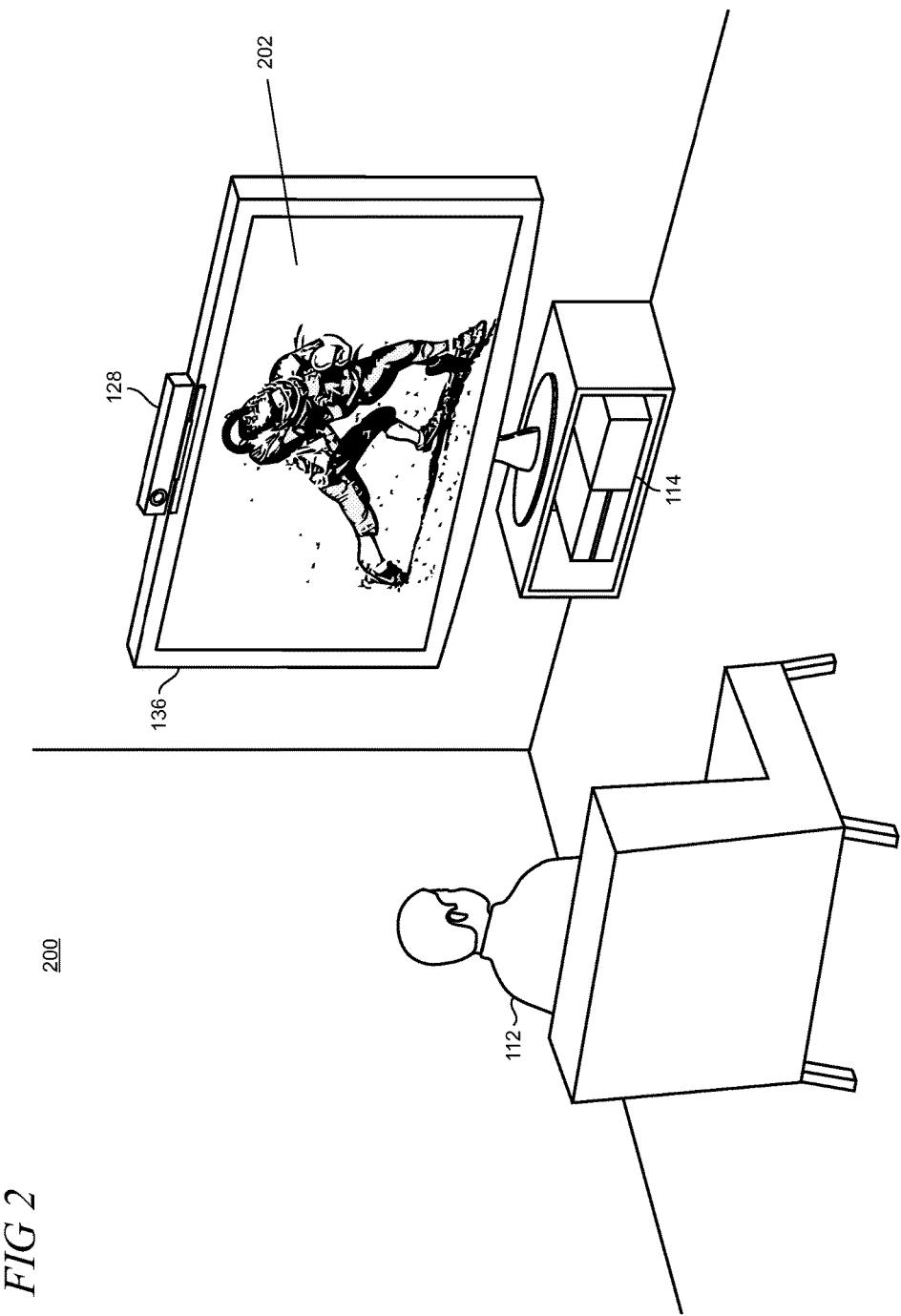
FIGS. 2-4 show pictorial views of an illustrative example of the present enhanced interactive TV experiences in which a user interacts with a multimedia console in a typical home environment.
Figure 3:
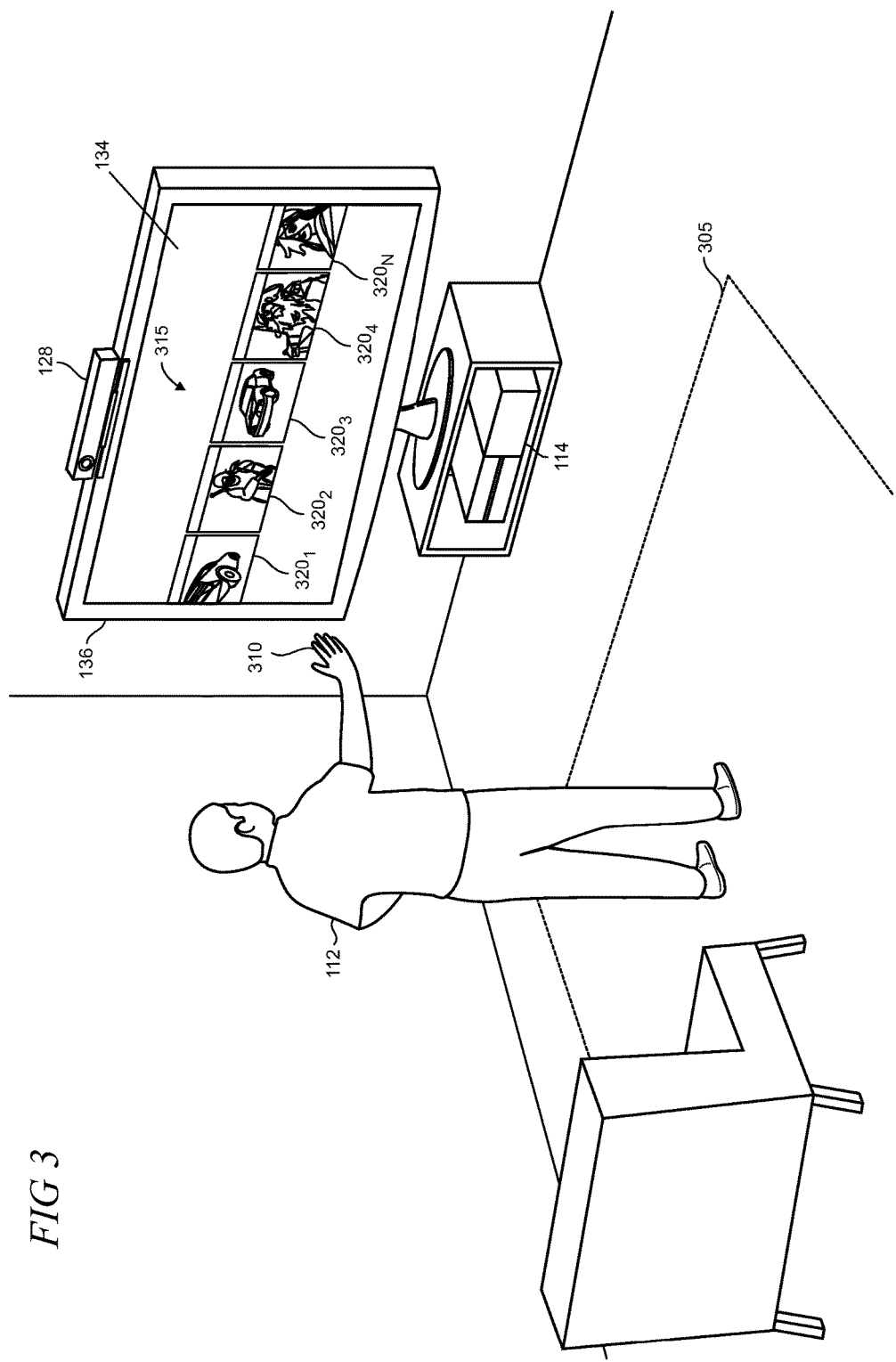
Figure 4:
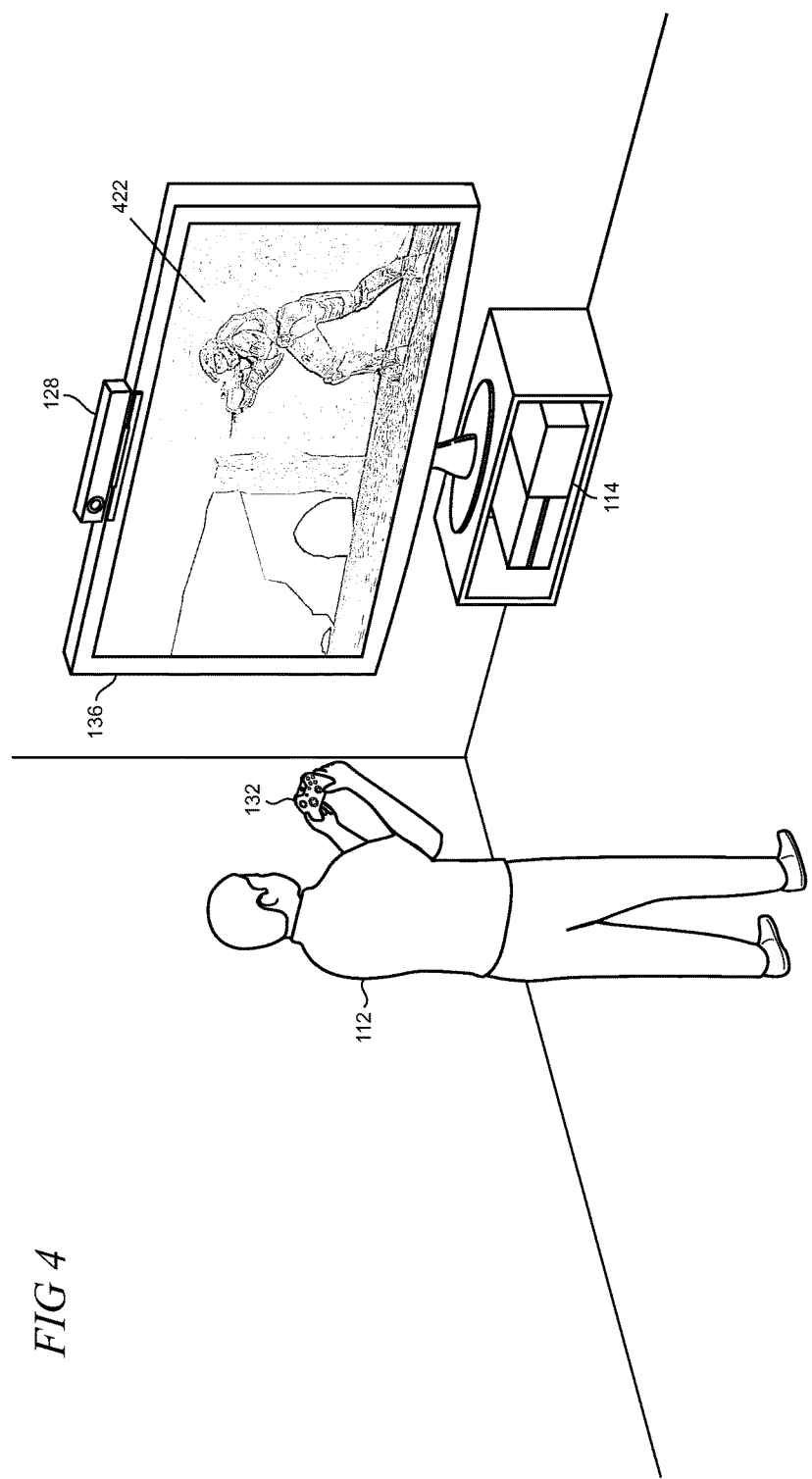

FIGS. 2-4 show pictorial views of an illustrative example of the present enhanced interactive TV experiences in which the user 112 interacts with the multimedia console 114 in a typical home environment 200. In FIG. 2, the user 112 is watching a video 202 of a sporting event (e.g., an American football game) on the television 136. The video 202 is provided by a content provider such as the entertainment service 102 and the other service/data providers 118 shown in FIG. 1. The video 202 may be a part of television programming in some cases, or may be provided as part of a digital content stream in others.

In addition to viewing TV, the multimedia console 114 is typically configured for running gaming and non-gaming applications using local and/or networked programming and content, playing pre-recorded multimedia such as optical discs including DVDs (Digital Versatile Discs) and CDs (Compact Discs), streaming multimedia (e.g., music and video) from a network, participating in social media, browsing the Internet and other networked media and content, or the like using a coupled audio/visual display such as the television 136. In some implementations, the multimedia console 114 may be configured to support conventional cable television ("CATV") sources using, for example, an HDMI (High Definition Multimedia Interface) connection.

The multimedia console 114 is operatively coupled to the camera system 128 which may be implemented using one or more video cameras that are configured to visually monitor a physical space 305 that is indicated generally by the dashed line in FIG. 3 that is occupied by the user 112. As described below in more detail, camera system 128 is configured to capture, track, and analyze the movements and/or gestures of the user 112 so that they can be used as controls that may be employed to affect, for example, an app or an operating system running on the multimedia console 114. Various motions of the hands 310 or other body parts of the user 112 may correspond to common system-wide tasks such as selecting a game or other application from a main user interface.

For example as shown in FIG. 3, the user 112 can navigate among selectable objects 315 that include various icons $320_{1-N}$ that are shown on the UI 134 on the television 136, browse through items in a hierarchical menu, open a file, close a file, save a file, or the like. In addition, the user 112 may use movements and/or gestures to end, pause, or save a game, select a level, view high scores, communicate with a friend, etc. Virtually any controllable aspect of an operating system and/or application may be controlled by movements of the user 112. A full range of motion of the user 112 may be available, used, and analyzed in any suitable manner to interact with an application or operating system that executes on the multimedia console 114. While the user 112 is shown standing in FIG. 3, the camera system 128 can also recognize gestures that are performed while the user is seated. The camera system 128 can also be utilized to capture, track, and analyze movements by the user 112 to control gameplay as a gaming application executes on the multimedia console 114.

The user may also utilize the controller 132 to interact with the multimedia console 114. The controller 132 may include a variety of physical controls including joysticks, a directional pad ("D-pad"), and various buttons. One or more triggers and/or bumpers (not shown) may also be incorporated into the controller 132. The user 112 can also typically interact with a user interface 134 that is shown on a display device 136 such as a television, projector, or monitor. FIG. 4 shows the user 112 using the controller 132 to interact with a game 422 that is being played on the multimedia console 114 and shown on the display device 136.

Figure 5:
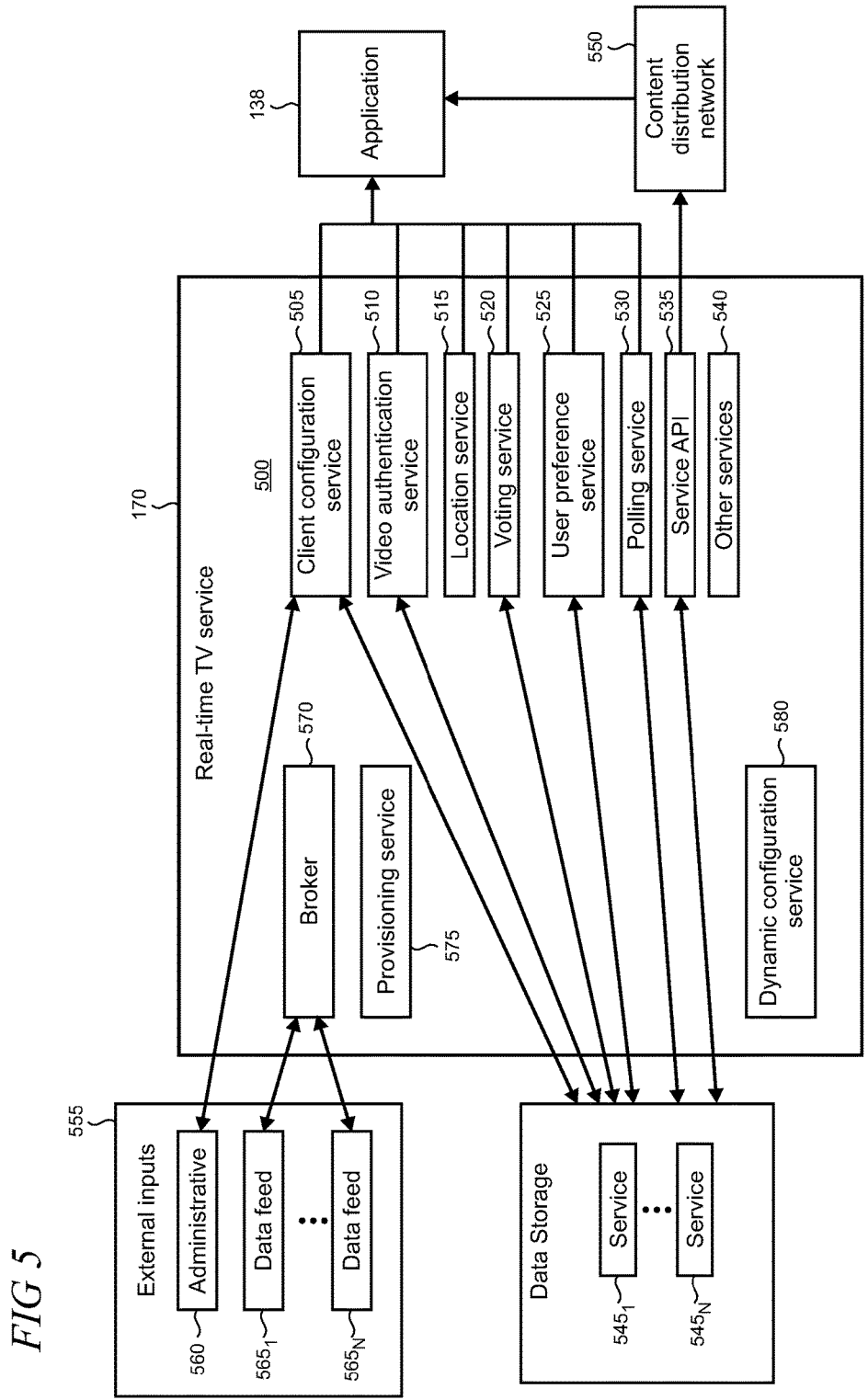
FIG. 5 is a functional block diagram of illustrative elements that may be used to support a real-time TV service.

FIG. 5 is a functional block diagram of illustrative elements that may be used to support the real-time TV service 170. As shown, the real-time TV service exposes a variety of services 500 to the applications 138 including a client configuration service 505, a video authentication service 510, a location service 515 (e.g., a service that can determine a geographic location based on an IP (Internet Protocol) address of a device, a voting service 520, a user preference service 525, a polling service 530, a service API (application programming interface) 535, and other services 540. Some of the services 500 are backed by one or more data storage services 545, as shown. The service API 535 interfaces with a content distribution network element 550.

External inputs 555 to the real-time TV service 170 include administrative input 560 to the client configuration service 505 as well as external data feeds 565 which can be provided, for example, by third party content sources to support various user experiences supported by the applications 138. The data feeds 565 are interfaced with a broker 570 instantiated in the real-time TV service 170. Other services supported in the real-time TV service 170 include a provisioning service 575 and a dynamic configuration service 580.

Figure 6:
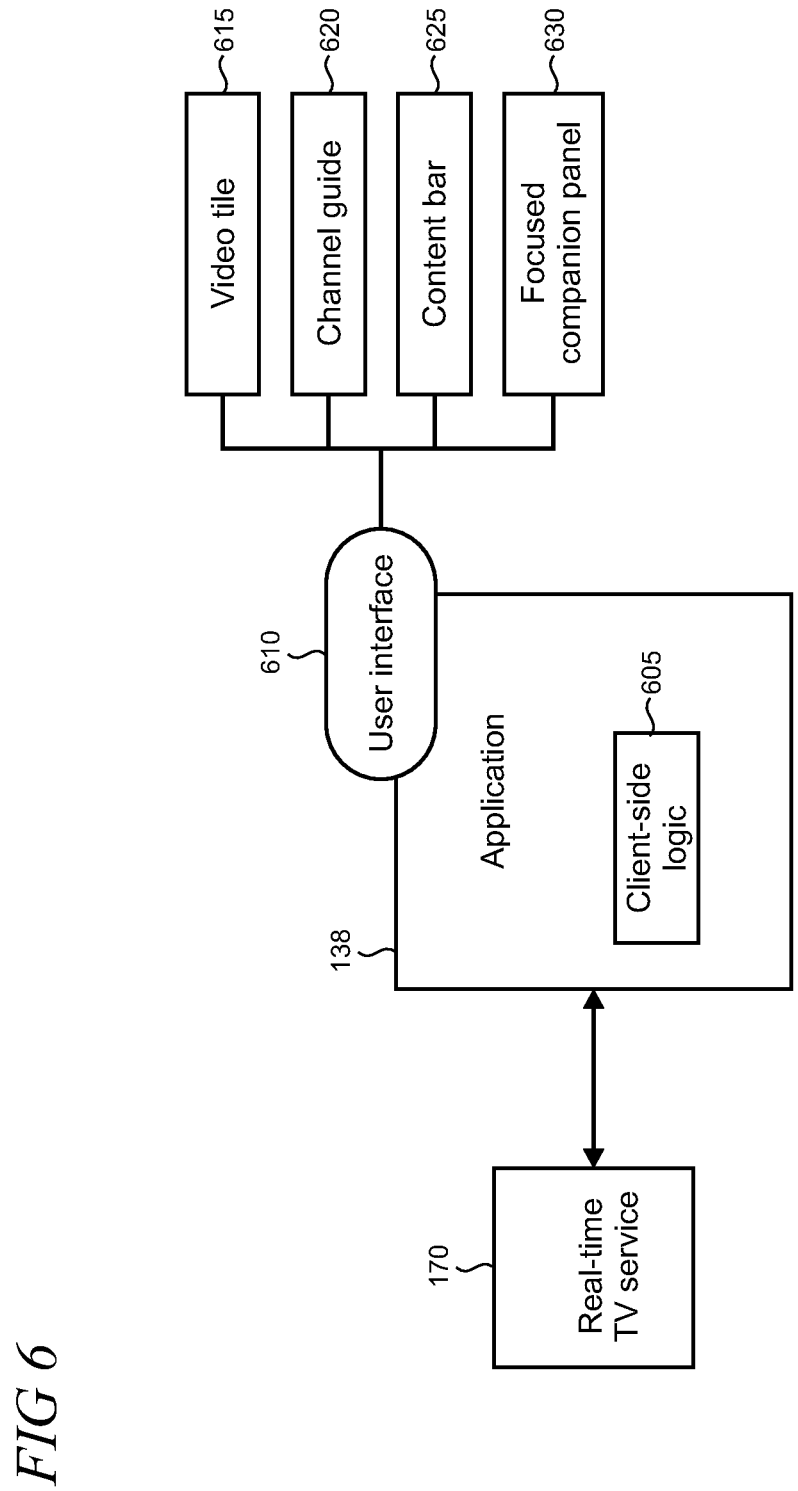
FIG. 6 shows illustrative UI elements that may be exposed by an application that is interacting with the real-time TV service.
Figure 7:
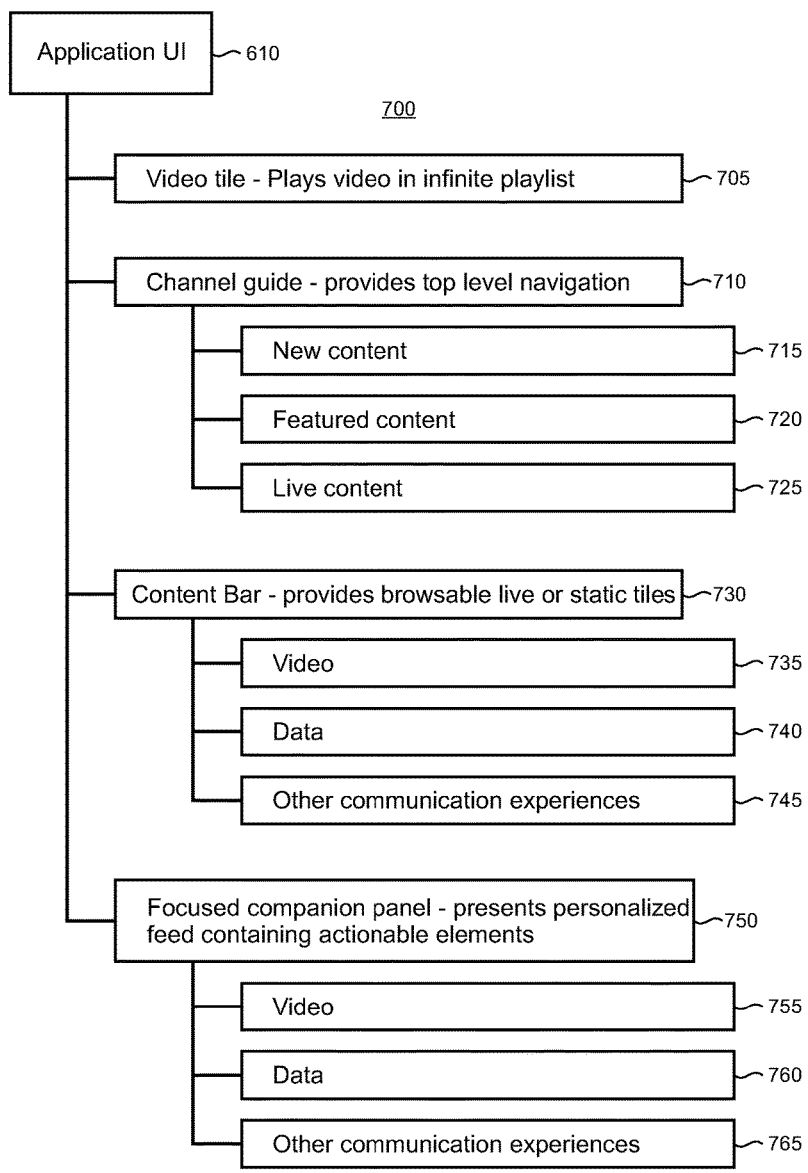
FIG. 7 shows an illustrative taxonomy of functions that may be exposed by application UI elements.

With the present enhanced interactive TV experiences, the real-time TV service 170 operates with client-side logic elements 605, as shown in FIG. 6, to support a user interface (UI) 610 that is configured for supporting a live stream of personalized data that enhances the user's comprehension and awareness of live TV events. The UI 610 utilizes four UI elements including a video tile 615, a channel guide 620, a content bar 625, and a focused companion panel 630. As shown in the taxonomy 700 in FIG. 7, the video tile 615 can play video in an "infinite" playlist that automatically plays through all video content in the application (as indicated by reference numeral 705). This feature creates a virtual around the clock network of content to users and may be used in over-the-top (OTT) online video networks in some implementations.

The channel guide 620 is top-level navigation element 710 that includes tags for new content 715, featured content 720, and live content 725. Each channel can focus on a specific area of subject matter. For example, in an illustrative example of a sports application, there may be a channel called "Game Center" that provides experiences related to this week's games and another channel called "Fantasy" that provides experiences related to the users' fantasy football team. The new tags guide the user to content that has not been seen yet. The live tags guide the user to live content against different services that the user is authenticated to utilize. Featured tags promote the most important areas of the application at a particular moment in time.

The content bar 625 provides individual browsable tiles 730 that represent video 735, data 740, or other communication experiences 745. These tiles may be static or they may be "lit up" with live data depending on the context. The user can visually scan or physically browse the content bar in order to decide on the piece of content he/she wishes to focus on. For example, in the sports application scenario, a static tile may be a team schedule, which does not change during the course of a season. While a more live tile might be an individual game and include the current game score, game time, ball possession, etc.

Figure 8:
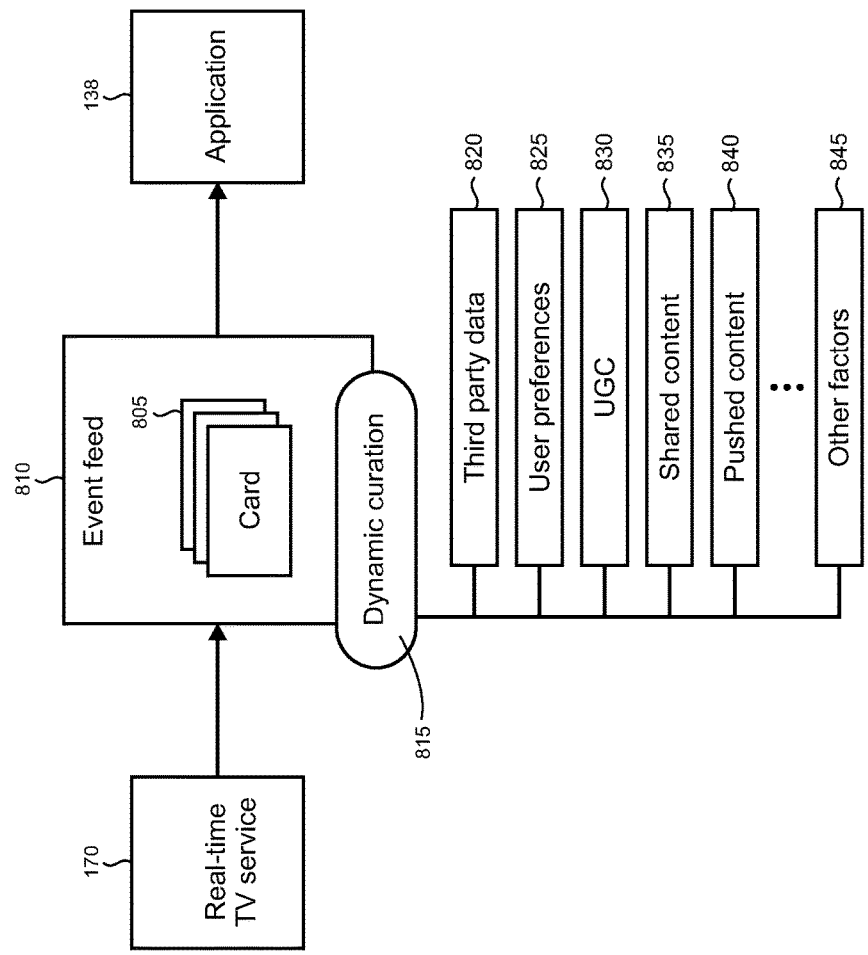
FIG. 8 shows an illustrative event feed from the real-time TV service to an application in which the event feed is dynamically curated using content in the form of cards.
Figures 9, 10:
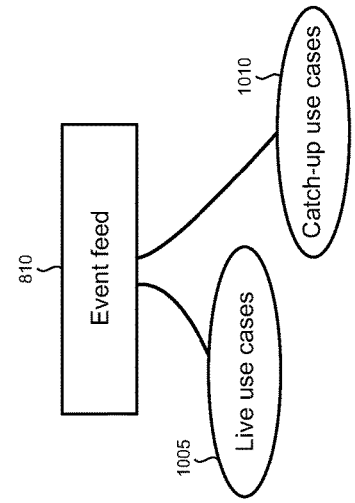
FIG. 9 shows a set of illustrative card types in the context of a sports application.
FIG. 10 illustratively shows how an event feed can include live use and catch-up use cases.

The focused companion panel 630 can replace all other navigation UIs, allowing the user to lock in on the piece of content that he/she is most interested in at the moment. The user can allow the companion panel to create a personalized feed 750 of video 755, data 760, and/or other communication experiences 765 within the context of the panel. The user can also take action on elements to select a video to play, get more information, share with a friend, etc. For example, in the illustrative sports application, a "Live Game Event Feed" companion panel can serve to the user a series of cards 805, as shown in FIG. 8, that enhance the viewing of a live game or serve as a proxy to a live video feed of the game if the user cannot or does not want to pair the panel with the live game video. Illustrative cards 900 in various categories in the context of an illustrative sports application pertaining to football are shown in FIG. 9. It is emphasized that the cards 900 are intended to be illustrative and not exhaustive and that other types of cards can be used to meet the needs of a particular implementation of the present enhanced interactive TV experiences. Cards can be organized to include data, objects, graphics and other information that is related by theme, type, genre, subject, and the like.

Returning to FIG. 8, an event feed 810 is a type of focused companion panel that provides the user with an aggregated feed of video and data elements that create a timeline of individual elements. These elements are dynamically curated, as indicated by reference numeral 815, through a variety of means including aggregation of third party data 820, user preferences 825, user-generated content (UGC) 830, content shared by friends/followers 835, content pushed by a live operations organization 840, or using other factors 845.

A combination of cloud-based data and client-side logic are used to generate the virtual timeline. The technology is able to deliver a different curation of the timeline based on the use case and user preferences. As shown in FIG. 10, there are typically two dominant use cases for the event feed 810 including live use cases 1005 and catch-up use cases 1010.

For live use cases 1005 (such as sporting events, live television events, etc.), the event feed can amplify the user's understanding and/or excitement by connecting the user to supplemental video and data content (such as instant replays or text content that breaks down a particular play). Additionally, the user can be connected to other users that are invested in the same live content. For example, in the illustrative sports application 138, a user can choose to support a particular team in his/her game and the system will bias the video and data cards 805 into that user's feed. This feature can connect users together and/or the curation enhances the user's feelings of belonging and companionship during the live event. The user can passively watch the data and video cards come in, or he/she can actively navigate and action on the individual elements.

For catch-up use cases 1010, the event feed provides the user with a simple way to relive the stories that surfaced during the previous live event. Video and data are curated by the system and a different set of content can be surfaced. For example, in the game application, a deeper set of game highlights is typically surfaced in a catch-up scenario than would be during a live event. However, common data cards that describe aspects of the game in detail (e.g., every play in a football game) are suppressed in favor of bigger moments that tell the story of the game more directly. The user can play videos and action on data in order to get more information on individual elements.

Figure 11:
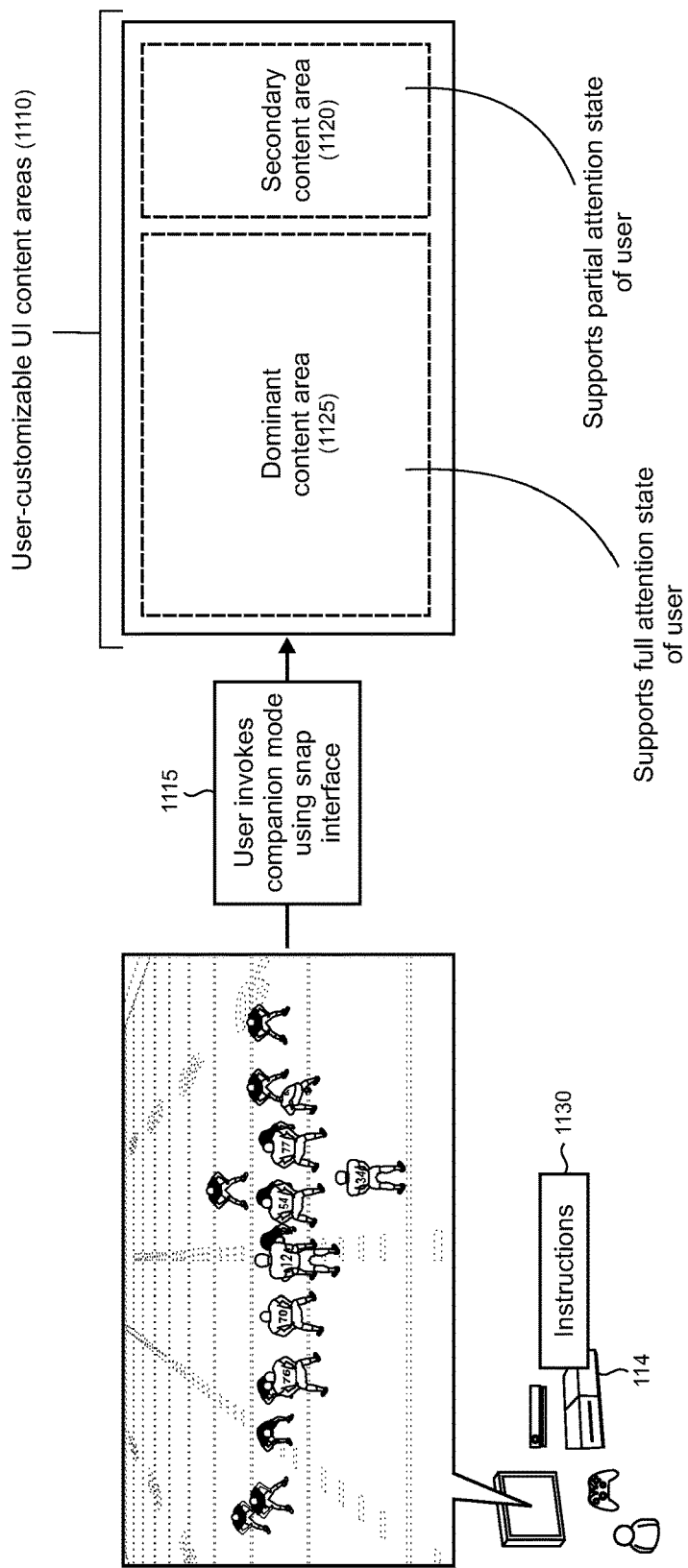
FIG. 11 shows an illustrative arrangement in which an application UI is divided into a dominant content area and a secondary content area.

As shown in the UI 1100 in FIG. 11, the illustrative sports application 138 and real-time TV service 170 support a feature that exposes user-customizable UI content areas, as indicated by reference numeral 1110, that place the UI into a companion mode. The companion mode is a UI organization that is optimized when a user moves from full attention to partial attention states. The real-time TV service 170 can determine what content to display and its organization, automatically update certain content, and support the movement between content elements in an easy and intuitive way.

For example, when the user is fully engaged with the sports application on the multimedia console 114 (FIG. 1) that is showing a live game, the user may decide to play a video game, but still want the ability to glance over and see key information about the live game. The user can invoke the companion mode through the snap-application interface of the platform as indicated by reference numeral 1115. In response, the application reduces the available content to a summary of that particular game. The game summary may contain a visual purposeful hierarchy of important events (e.g., plays) that allows the user to digest game updates at a glance. Further, the user interface changes to a scheme that allows the user to easily shift to another live game, his/her personalized fantasy data or other high value content.

The companion mode may be segregated into predetermined content areas that can be personalized by the user. For example, the companion mode may be implemented under control of the user as a secondary content area 1120, adjacent to a dominant content area 1125. Typically, the real-time TV service 170 (FIG. 5) can interact with the application 138 in order to generate a stream of instructions 1130 for the hardware on a device (e.g., console 114) including, for example, the central processing unit (CPU) and/or graphics processing unit (GPU) that cause the device to optimize utilization and allocation of computing resources when generating the content areas on the display. For example, such optimization can include adjustment of resolution, frame rate, and the like in order to render the dominant and secondary content areas efficiently while maintaining display accuracy so that the dominant content area is free from glitches and other unwanted artifacts. In the case of the multimedia console or PCs, the content areas are considered "snapped" or scaled down within the overall operating system operating on those platforms.

Figure 12:
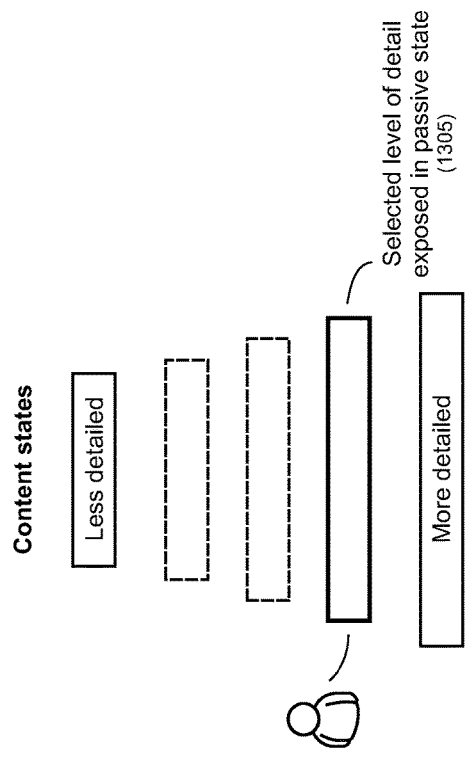
FIG. 12 shows illustrative static and cycling content areas.

As shown in FIG. 12, there may be two types of content areas within the companion mode UI 1205—static and cycling, as respectively indicated by reference numerals 1210 and 1215. A static content area is locked into place either by the system or by the user. For example, in the illustrative sports application 138 one static content area is the Favorite Team window, which displays current information about the user's favorite team (i.e., a low churn, high emotional investment area). A cycling content area rotates through data or videos. For example, in the illustrative sports application 138, a cycling content area is the Fantasy window, which cycles through the user's different fantasy teams providing current scores (i.e., a high churn, high emotional investment area).

Figure 13:
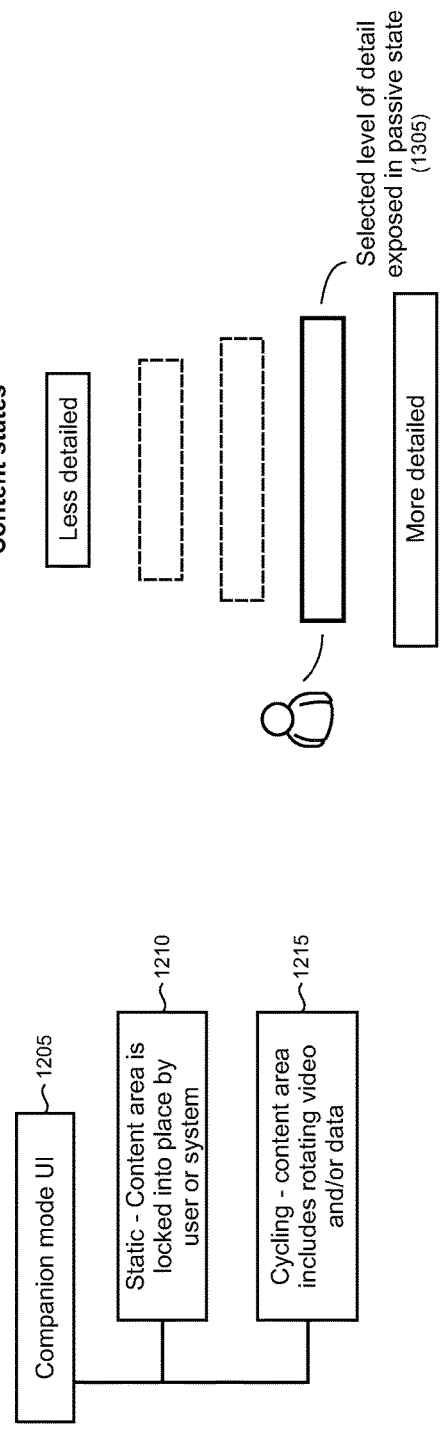
FIG. 13 shows how a user may select among various levels of detail of content exposed in a secondary content area.
Figure 14:
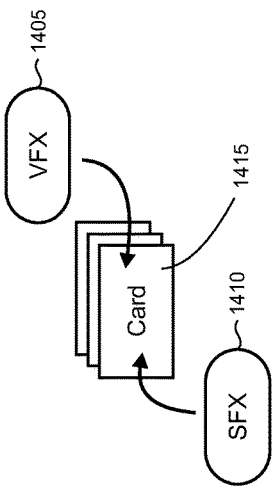
FIG. 14 illustratively shows how a card can be treated using special effects and/or visual effects.

In addition as shown in FIG. 13, the user can select a content area and dive deeper into the details. For example, in the illustrative sports application 138, the user can action on a particular game in a Game Center content area, which then goes to a data and video feed specific to that game. Once the user has reached a state that matches the content he/she is interested in, the application can be left in a passive state that updates periodically, as indicated by reference numeral 1305. The update is configured to be more or less intrusive to the user's attention based on the importance of the event taking place. For example, in the illustrative sports application 138, a touchdown that is scored by the user's favorite team could use animation, such as VFX (visual effects) 1405 and SFX (special effects) 1410 as shown in FIG. 14 in a given card 1415 to create a peripheral moment that is more attention gathering than a field goal (i.e., an event resulting in fewer points) scored by a team other than the user's favorite team.

Figure 15:
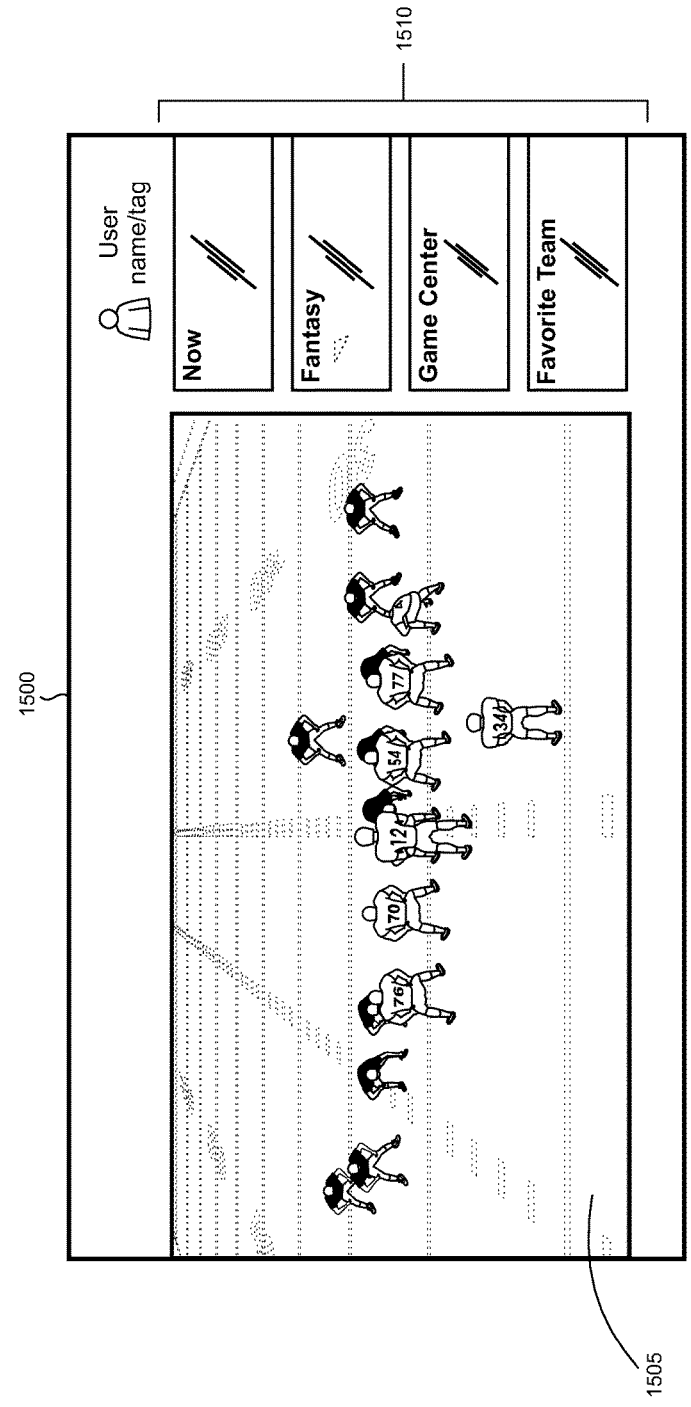
FIGS. 15 and 16 show screen captures of UIs exposed by an illustrative sports application.
Figure 16:
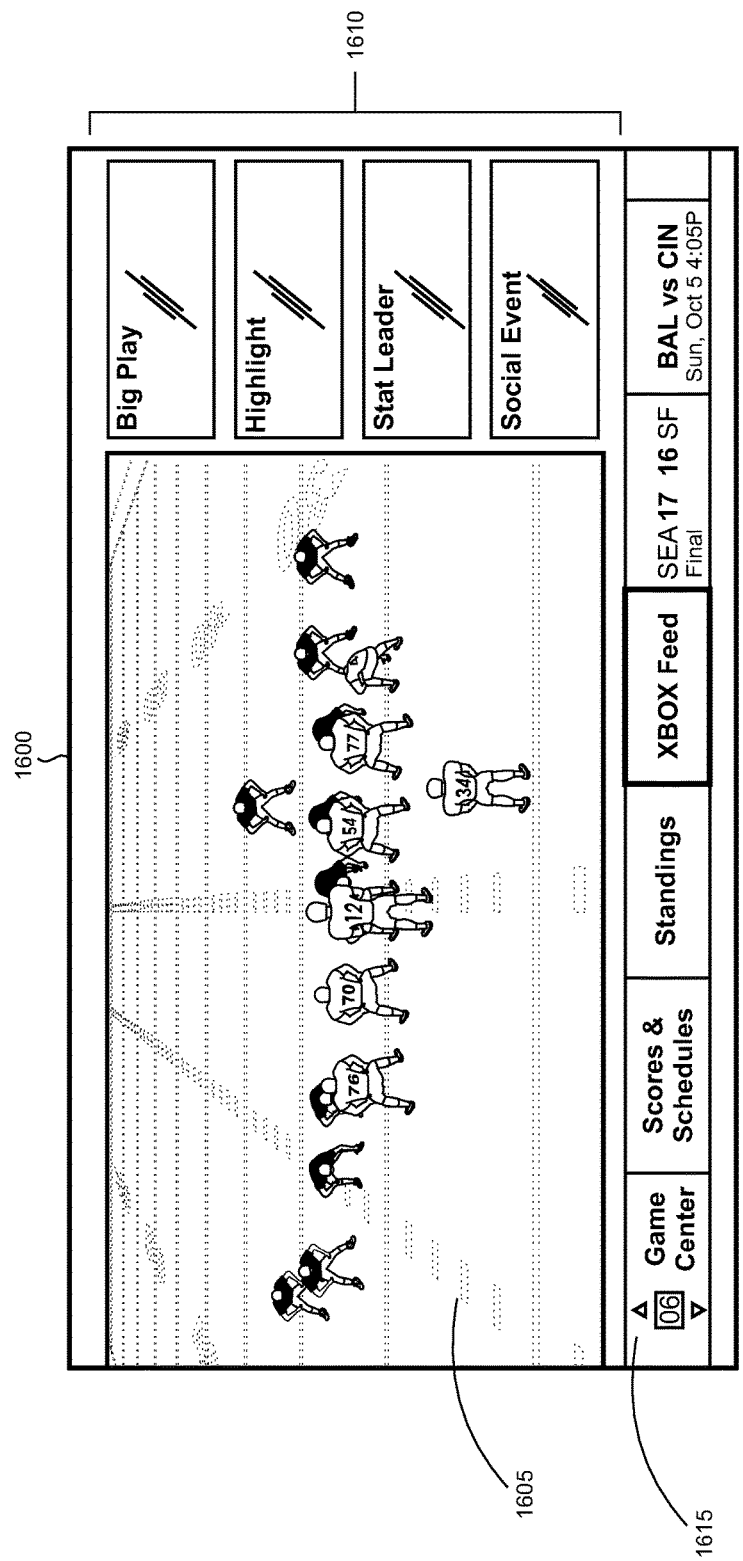

FIGS. 15 and 16 show screen captures of UIs exposed by the illustrative sports application 138. In FIG. 15, UI 1500 shows the video tile 1505 in the dominant content area and the channel guide 1510 that exposes various cards in the secondary content area. Personal information pertaining to the user, such as name, gamertag, statistics, etc., can be displayed in an area above the channel guide in some implementations. In FIG. 16, UI 1600 shows the video tile 1605 and an illustrative focused companion panel 1610 that exposes a dynamically curated event feed that is customized to the user. Also shown is an illustrative content bar 1615.

Figure 17:
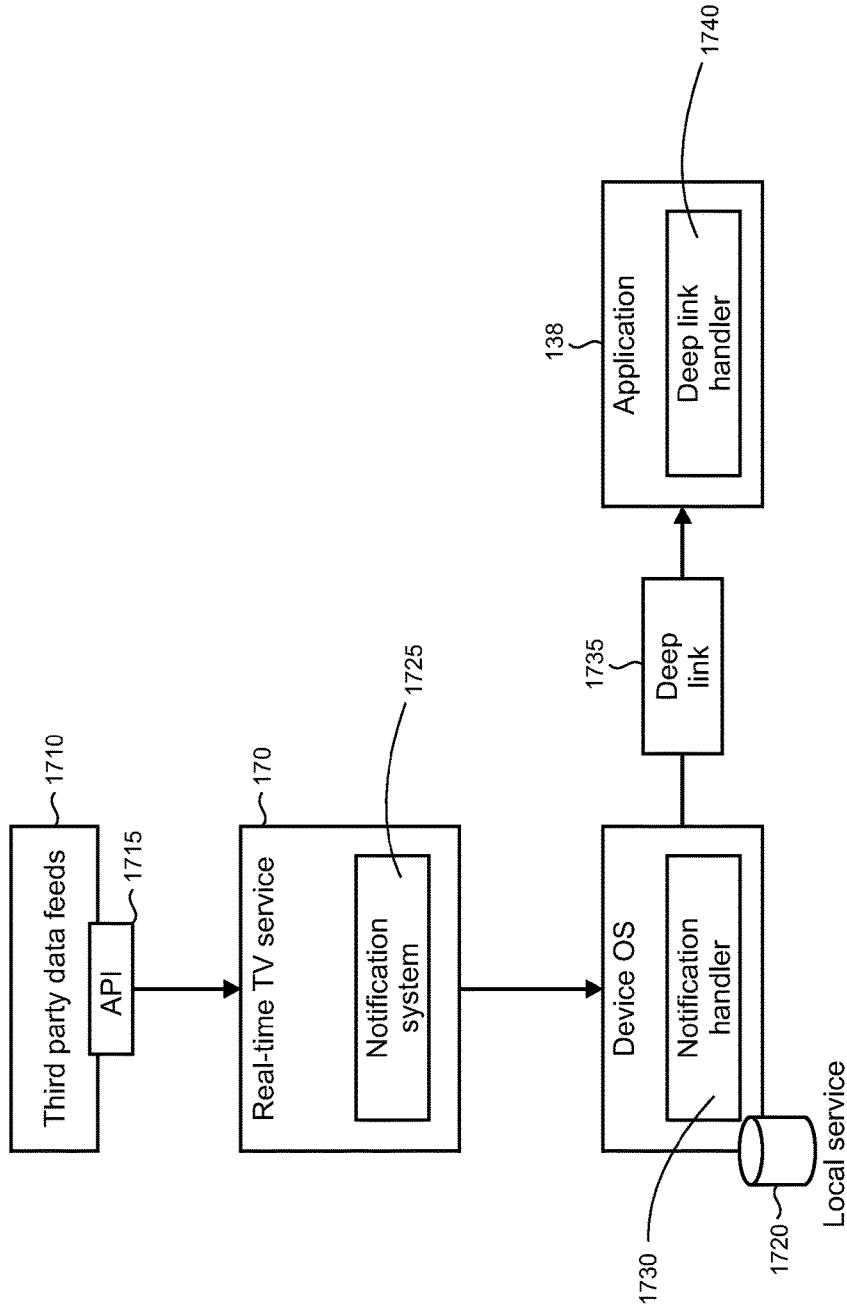
FIG. 17 shows an illustrative arrangement in which the real-time TV service is configured for providing notifications to an application responsively to data feeds from a third party.

FIG. 17 shows an illustrative arrangement in which the real-time TV service 170 is configured for providing notifications to an application 138 responsively to data feeds 1710 from a third party that exposes an API 1715. The real-time TV service 170 polls data from the API and stores it. Certain user profile data is also stored that the user submits actively, but also passively—as a background process of the application 138. Additionally, a small local service 1720 is located on the multimedia console platform that stores other data when the user boots into the application 138.

When the real-time TV service 170 detects certain events from the third party, it pushes a payload to the local service using respective notification system and handlers 1725 and 1730, which may run whether the application 138 is active or not. The local service launches a system notification that the user can action upon to launch the app into that custom location. Included in the notification is a very small table of code forming a deep link 1735 that the application 138 accesses at launch. The application 138 uses a deep link handler 1740 to scrape within the application looking for the particular content indicated by the notification code, then sorts the results into a priority order based on the type of notification and lands the user in the correct location in the application at launch.

Figure 18:
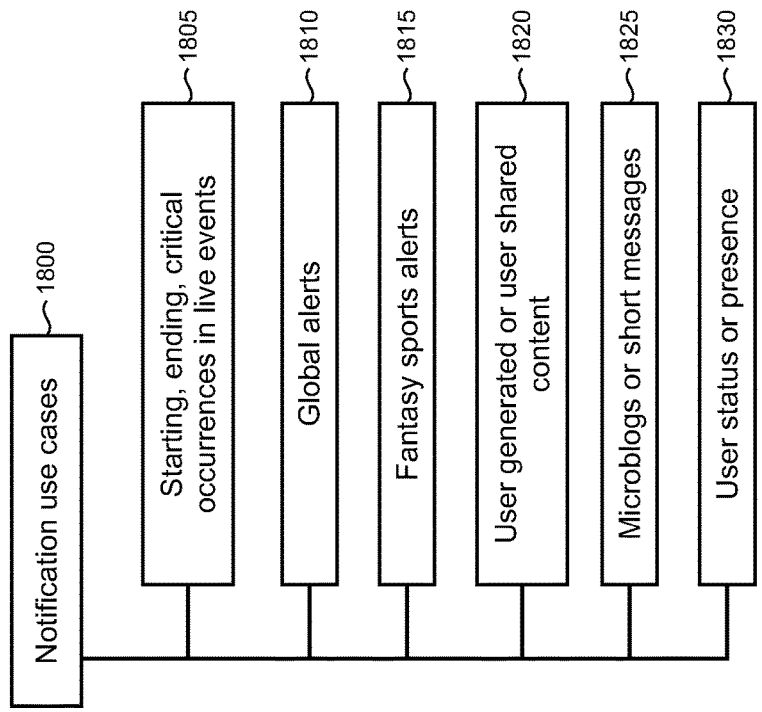
FIG. 18 shows illustrative use cases for notifications.

As shown in FIG. 18, use cases 1800 may include notifications about the starting, ending, or critical occurrences during live events 1805, global alerts propagated by a live operations team 1810, fantasy sports alerts 1815, user generated or user shared content 1820, microblogs or other short messages 1825, and user status or presence 1830.

Figure 19:
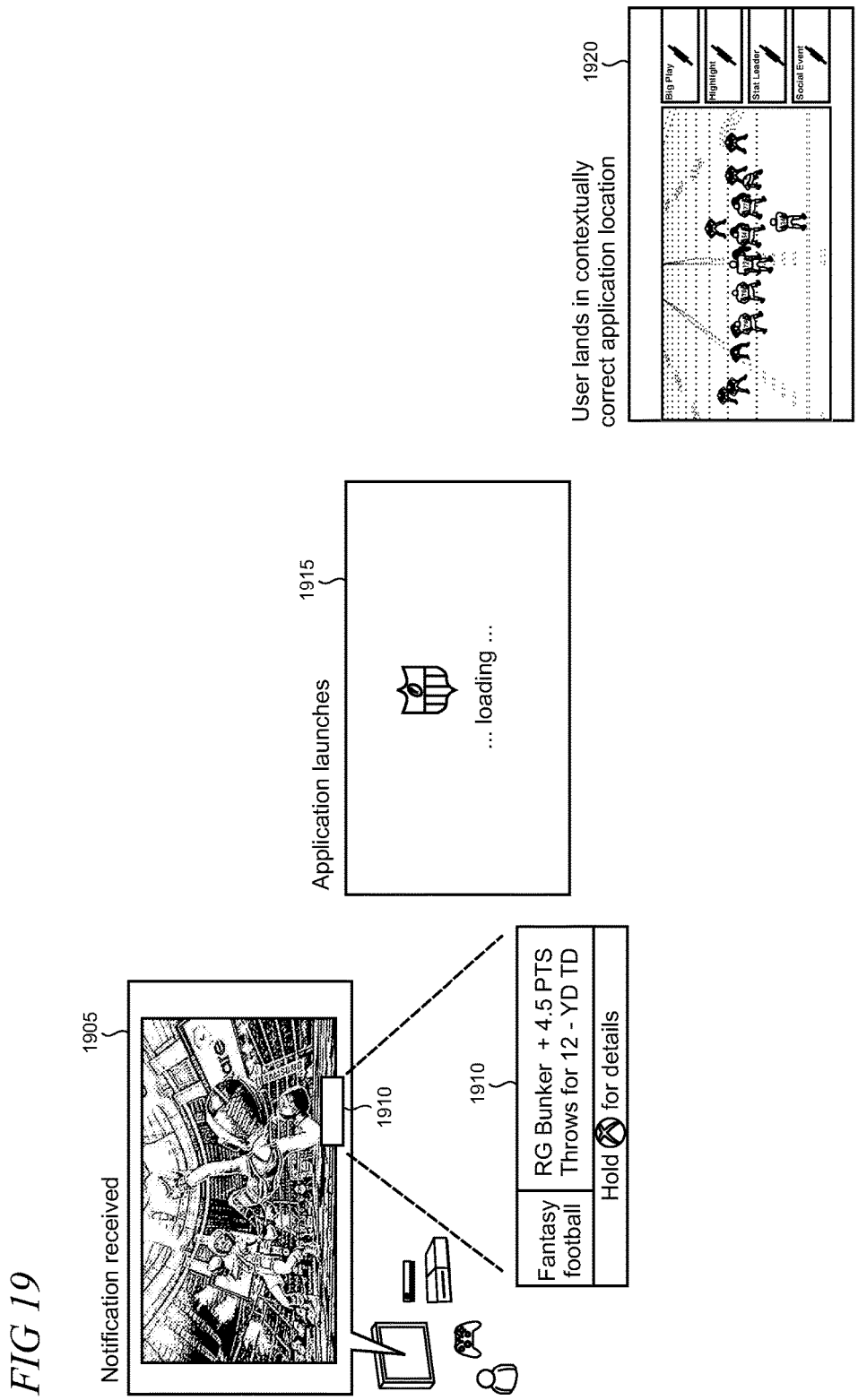
FIG. 19 shows an illustrative sequence of screen captures of application UIs associated with a notification.

FIG. 19 shows an illustrative sequence of screen captures of application UIs associated with a notification. In the upper left of the drawing, a UI 1905 displays an incoming notification 1910 at the bottom of the UI (the notification is also shown in enlarged form in FIG. 19). The application associated with the notification launches, as shown in the UI 1915 in the center of the drawing, and lands the user in the contextually correct location as shown in the UI 1920 in the lower right of the drawing.

Figure 20:
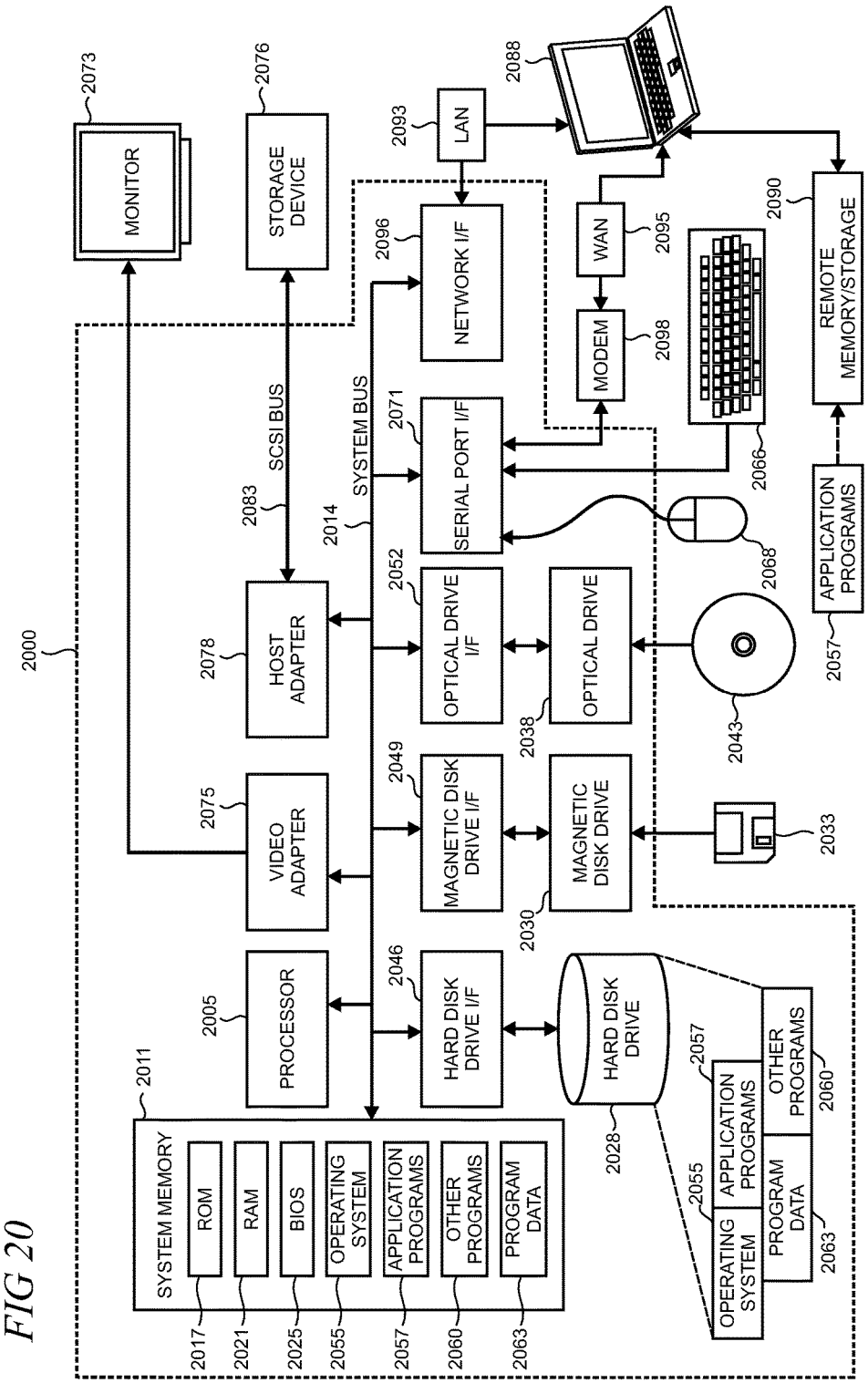
FIG. 20 is a simplified block diagram of an illustrative computer system such as a personal computer (PC) or server that may be used in part to implement the present enhanced interactive TV experiences.

FIG. 20 is a simplified block diagram of an illustrative computer system 2000 such as a PC, client device, or server with which the present enhanced interactive television experiences may be implemented. Computer system 2000 includes a processing unit 2005, a system memory 2011, and a system bus 2014 that couples various system components including the system memory 2011 to the processing unit 2005. The system bus 2014 may be any of several types of bus structures including a memory bus or memory controller, a peripheral bus, and a local bus using any of a variety of bus architectures. The system memory 2011 includes read only memory ("ROM") 2017 and random access memory ("RAM") 2021. A basic input/output system ("BIOS") 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer readable storage media provide non-volatile storage of computer readable instructions, data structures, program modules, and other data for the computer system 2000. Although this illustrative example shows a hard disk, a removable magnetic disk 2033, and a removable optical disk 2043, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present enhanced interactive television experiences. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 2005 through a serial port interface 2071 that is coupled to the system bus 2014, but may be connected by other interfaces, such as a parallel port, game port, or USB. A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface ("SCSI") bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network ("LAN") 2093 and a wide area network ("WAN") 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present enhanced interactive television experiences. It may be desirable and/or advantageous to enable other types of computing platforms other than the multimedia console 114 to implement the present enhanced interactive television experiences in some applications.

Figure 21:
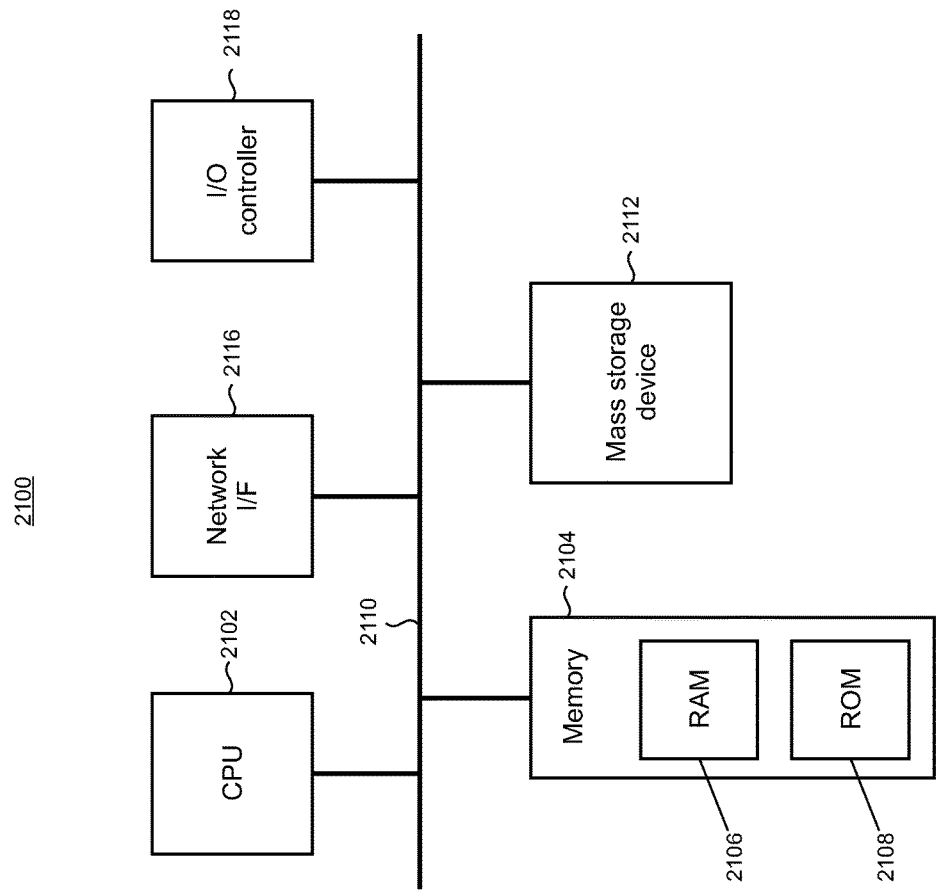
FIG. 21 shows a block diagram of an illustrative computing platform that may be used in part to implement the present enhanced interactive TV experiences.

FIG. 21 shows an illustrative architecture 2100 for a device capable of executing the various components described herein for providing the present enhanced interactive television experiences. Thus, the architecture 2100 illustrated in FIG. 21 shows an architecture that may be adapted for a server computer, mobile phone, a PDA, a smartphone, a desktop computer, a netbook computer, a tablet computer, GPS device, gaming console, and/or a laptop computer. The architecture 2100 may be utilized to execute any aspect of the components presented herein.

The architecture 2100 illustrated in FIG. 21 includes a CPU (Central Processing Unit) 2102, a system memory 2104, including a RAM 2106 and a ROM 2108, and a system bus 2110 that couples the memory 2104 to the CPU 2102. A basic input/output system containing the basic routines that help to transfer information between elements within the architecture 2100, such as during startup, is stored in the ROM 2108. The architecture 2100 further includes a mass storage device 2112 for storing software code or other computer-executed code that is utilized to implement applications, the file system, and the operating system.

The mass storage device 2112 is connected to the CPU 2102 through a mass storage controller (not shown) connected to the bus 2110. The mass storage device 2112 and its associated computer-readable storage media provide non-volatile storage for the architecture 2100.

Although the description of computer-readable storage media contained herein refers to a mass storage device, such as a hard disk or CD-ROM drive, it may be appreciated by those skilled in the art that computer-readable storage media can be any available storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It may be appreciated that the network interface unit 2116 also may be utilized to connect to other types of networks and remote computer systems. The architecture 2100 also may include an input/output controller 2118 for receiving and processing input from a number of other devices, including a keyboard, mouse, or electronic stylus (not shown in FIG. 21). Similarly, the input/output controller 2118 may provide output to a display screen, a printer, or other type of output device (also not shown in FIG. 21).

It may be appreciated that the software components described herein may, when loaded into the CPU 2102 and executed, transform the CPU 2102 and the overall architecture 2100 from a general-purpose computing system into a special-purpose computing system customized to facilitate the functionality presented herein. The CPU 2102 may be constructed from any number of transistors or other discrete circuit elements, which may individually or collectively assume any number of states. More specifically, the CPU 2102 may operate as a finite-state machine, in response to executable instructions contained within the software modules disclosed herein. These computer-executable instructions may transform the CPU 2102 by specifying how the CPU 2102 transitions between states, thereby transforming the transistors or other discrete hardware elements constituting the CPU 2102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2100 in order to store and execute the software components presented herein. It may also be appreciated that the architecture 2100 may include other types of computing devices, including handheld computers, embedded computer systems, smartphones, PDAs, and other types of computing devices known to those skilled in the art. It is also contemplated that the architecture 2100 may not include all of the components shown in FIG. 21, may include other components that are not explicitly shown in FIG. 21, or may utilize an architecture completely different from that shown in FIG. 21.

Figure 22:
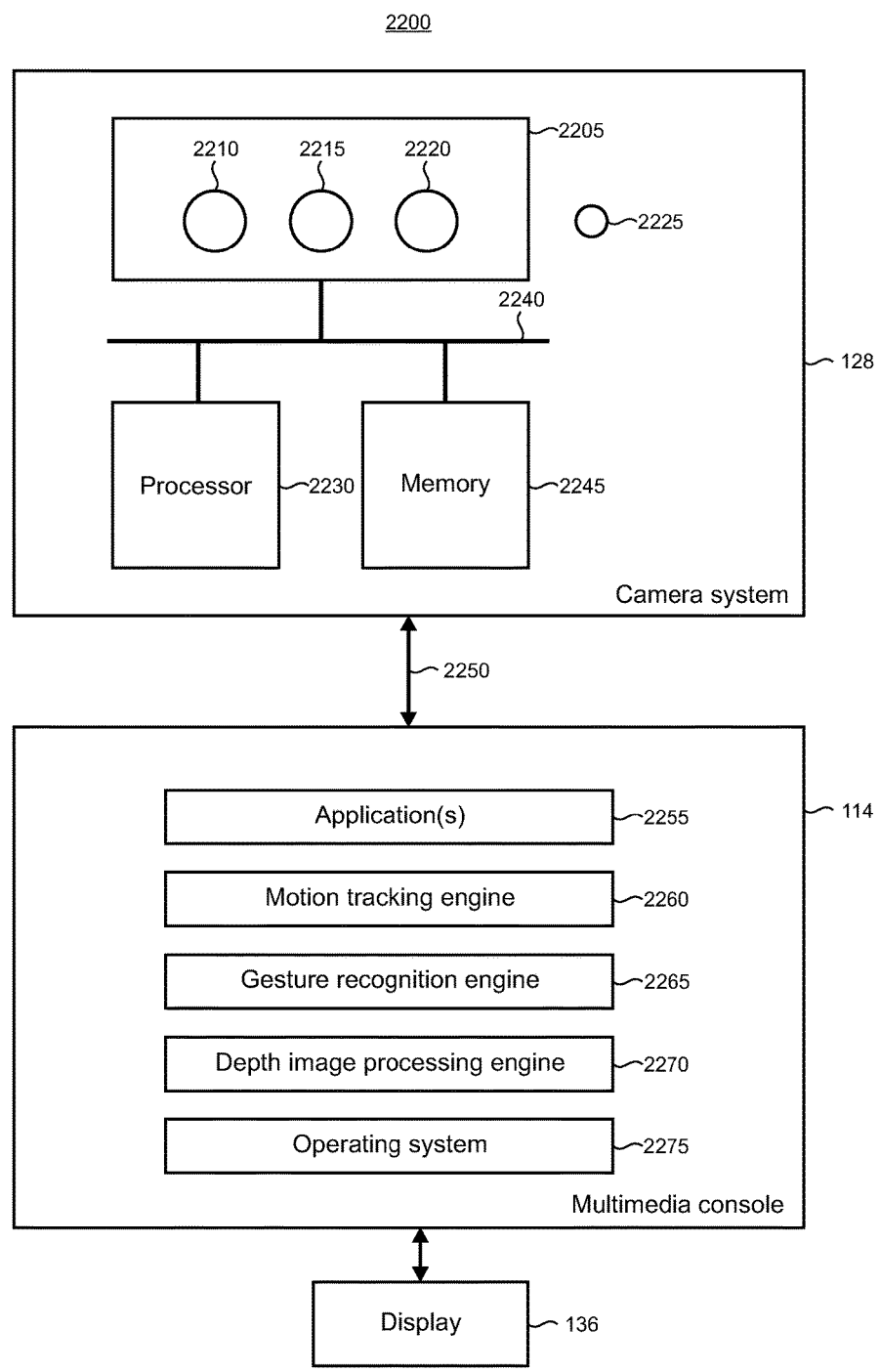
FIG. 22 shows a functional block diagram of an illustrative camera system that may be used in part to implement the present enhanced interactive TV experiences.

FIG. 22 shows illustrative functional components of the camera system 128 and multimedia console 114 that may be used as part of a target recognition, analysis, and tracking system to recognize human and non-human targets in a capture area of a physical space monitored by the camera system without the use of special sensing devices attached to the subjects, uniquely identify them, and track them in a three-dimensional space. The camera system 128 may be configured to capture video with depth information including a depth image that may include depth values via any suitable technique including, for example, time-of-flight, structured light, stereo image, or the like. In some implementations, the camera system 128 may organize the calculated depth information into "Z layers," or layers that may be perpendicular to a Z-axis extending from the depth camera along its line of sight.

As shown in FIG. 22, the camera system 128 includes an image capture component 2205. The image capture component 2205 may be configured to operate as a depth camera that may capture a depth image of a scene. The depth image may include a two-dimensional ("2D") pixel area of the captured scene where each pixel in the 2D pixel area may represent a depth value such as a distance in, for example, centimeters, millimeters, or the like of an object in the captured scene from the camera. In this example, the image capture component 2205 includes an IR light component 2210, an IR camera 2215, and a visible light RGB camera 2220 that may be configured in an array, as shown, or in an alternative geometry.

Various techniques may be utilized to capture depth video frames. For example, in time-of-flight analysis, the IR light component 2210 of the camera system 128 may emit an infrared light onto the capture area and may then detect the backscattered light from the surface of one or more targets and objects in the capture area using, for example, the IR camera 2215 and/or the RGB camera 2220. In some embodiments, pulsed infrared light may be used such that the time between an outgoing light pulse and a corresponding incoming light pulse may be measured and used to determine a physical distance from the camera system 128 to a particular location on the targets or objects in the capture area. Additionally, the phase of the outgoing light wave may be compared to the phase of the incoming light wave to determine a phase shift. The phase shift may then be used to determine a physical distance from the camera system to a particular location on the targets or objects. Time-of-flight analysis may be used to indirectly determine a physical distance from the camera system 128 to a particular location on the targets or objects by analyzing the intensity of the reflected beam of light over time via various techniques including, for example, shuttered light pulse imaging.

In other implementations, the camera system 128 may use structured light to capture depth information. In such an analysis, patterned light (i.e., light displayed as a known pattern such as a grid pattern or a stripe pattern) may be projected onto the capture area via, for example, the IR light component 2210. Upon striking the surface of one or more targets or objects in the capture area, the pattern may become deformed in response. Such a deformation of the pattern may be captured by, for example, the IR camera 2215 and/or the RGB camera 2220 and may then be analyzed to determine a physical distance from the camera system to a particular location on the targets or objects.

The camera system 128 may utilize two or more physically separated cameras that may view a capture area from different angles, to obtain visual stereo data that may be resolved to generate depth information. Other types of depth image arrangements using single or multiple cameras can also be used to create a depth image. The camera system 128 may further include a microphone 2225. The microphone 2225 may include a transducer or sensor that may receive and convert sound into an electrical signal. The microphone 2225 may be used to reduce feedback between the camera system 128 and the multimedia console 114 in a target recognition, analysis, and tracking system 2200. Additionally, the microphone 2225 may be used to receive audio signals that may also be provided by the user 112 to control applications such as game applications, non-game applications, or the like that may be executed by the multimedia console 114.

The camera system 128 may further include a processor 2230 that may be in operative communication with the image capture component 2205 over a bus 2240. The processor 2230 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The camera system 128 may further include a memory component 2245 that may store the instructions that may be executed by the processor 2230, images or frames of images captured by the cameras, user profiles or any other suitable information, images, or the like. According to one example, the memory component 2245 may include RAM, ROM, cache, Flash memory, a hard disk, or any other suitable storage component. As shown in FIG. 22, the memory component 2245 may be a separate component in communication with the image capture component 2205 and the processor 2230. Alternatively, the memory component 2245 may be integrated into the processor 2230 and/or the image capture component 2205. In one embodiment, some or all of the components of the camera system 128 are located in a single housing.

The camera system 128 operatively communicates with the multimedia console 114 over a communication link 2250. The communication link 2250 may be a wired connection including, for example, a USB (Universal Serial Bus) connection, a Firewire connection, an Ethernet cable connection, or the like and/or a wireless connection such as a wireless IEEE 802.11 connection. The multimedia console 114 can provide a clock to the camera system 128 that may be used to determine when to capture, for example, a scene via the communication link 2250. The camera system 128 may provide the depth information and images captured by, for example, the IR camera 2215 and/or the RGB camera 2220, including a skeletal model and/or facial tracking model that may be generated by the camera system 128, to the multimedia console 114 via the communication link 2250. The multimedia console 114 may then use the skeletal and/or facial tracking models, depth information, and captured images to, for example, create a virtual screen, adapt the user interface, and control apps/games 2255. The apps/games 2255 may include the user experience 122 (FIG. 1).

A motion tracking engine 2260 uses the skeletal and/or facial tracking models and the depth information to provide a control output to one or more apps/games 2255 running on the multimedia console 114 to which the camera system 128 is coupled. The information may also be used by a gesture recognition engine 2265, depth image processing engine 2270, and/or operating system 2275.

The depth image processing engine 2270 uses the depth images to track motion of objects, such as the user and other objects. The depth image processing engine 2270 will typically report to the operating system 2275 an identification of each object detected and the location of the object for each frame. The operating system 2275 can use that information to update the position or movement of an avatar, for example, or other images shown on the display 136, or to perform an action on the user interface.

The gesture recognition engine 2265 may utilize a gestures library (not shown) that can include a collection of gesture filters, each comprising information concerning a gesture that may be performed, for example, by a skeletal model (as the user moves). The gesture recognition engine 2265 may compare the frames captured by the camera system 114 in the form of the skeletal model and movements associated with it to the gesture filters in the gesture library to identify when a user (as represented by the skeletal model) has performed one or more gestures. Those gestures may be associated with various controls of an application and direct the system to open the personalized home screen as described above. Thus, the multimedia console 114 may employ the gestures library to interpret movements of the skeletal model and to control an operating system or an application running on the multimedia console based on the movements.

In some implementations, various aspects of the functionalities provided by the apps/games 2255, motion tracking engine 2260, gesture recognition engine 2265, depth image processing engine 2270, and/or operating system 2275 may be directly implemented on the camera system 128 itself.

Figure 23:
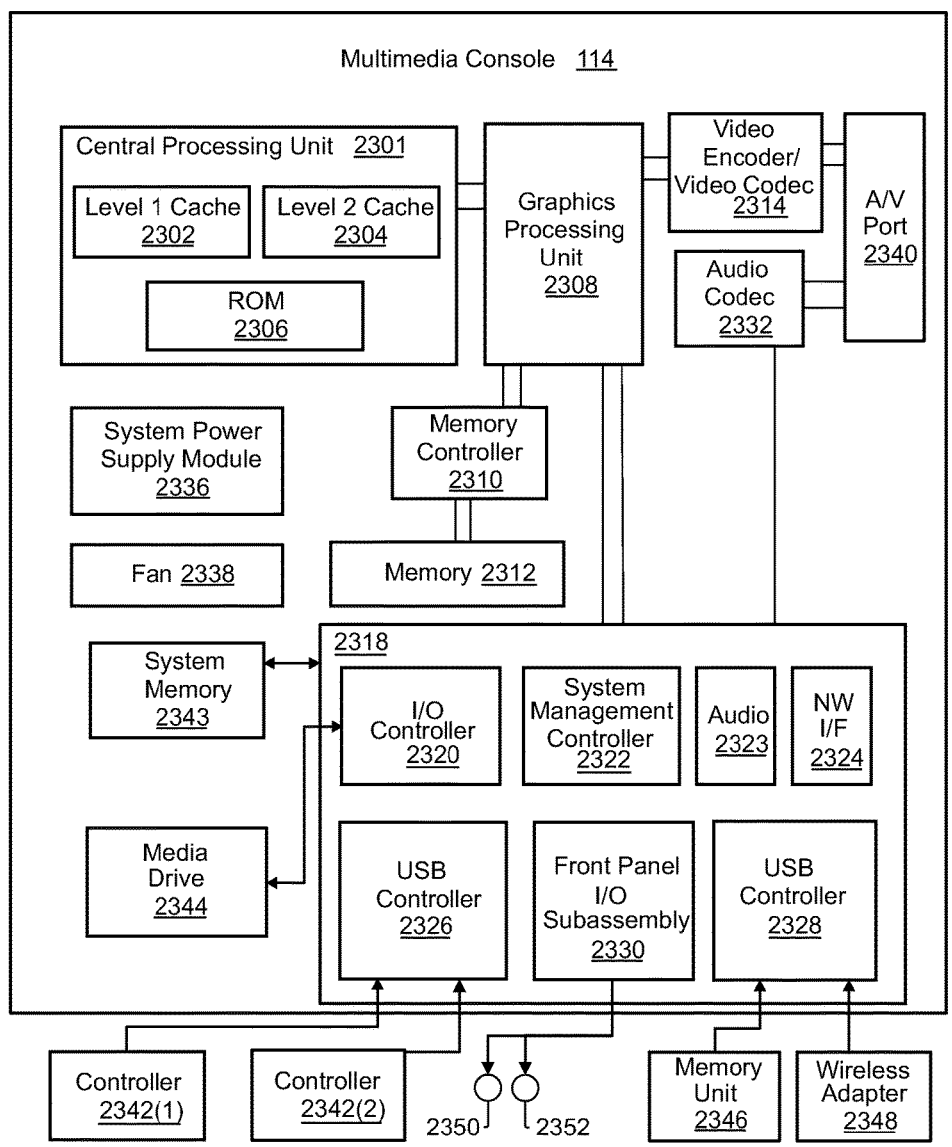
FIG. 23 shows a functional block diagram of an illustrative multimedia console that may be used in part to implement the present enhanced interactive TV experiences.

FIG. 23 is an illustrative functional block diagram of the multimedia console 114. The multimedia console 114 has a central processing unit (CPU) 2301 having a level 1 cache 2302, a level 2 cache 2304, and a Flash ROM (Read Only Memory) 2306. The level 1 cache 2302 and the level 2 cache 2304 temporarily store data and hence reduce the number of memory access cycles, thereby improving processing speed and throughput. The CPU 2301 may be configured with more than one core, and thus, additional level 1 and level 2 caches 2302 and 2304. The Flash ROM 2306 may store executable code that is loaded during an initial phase of a boot process when the multimedia console 114 is powered ON.

A graphics processing unit (GPU) 2308 and a video encoder/video codec (coder/decoder) 2314 form a video processing pipeline for high speed and high resolution graphics processing. Data is carried from the GPU 2308 to the video encoder/video codec 2314 via a bus. The video processing pipeline outputs data to an A/V (audio/video) port 2340 for transmission to a television or other display. A memory controller 2310 is connected to the GPU 2308 to facilitate processor access to various types of memory 2312, such as, but not limited to, a RAM.

The multimedia console 114 includes an I/O controller 2320, a system management controller 2322, an audio processing unit 2323, a network interface controller 2324, a first USB (Universal Serial Bus) host controller 2326, a second USB controller 2328, and a front panel I/O subassembly 2330 that are preferably implemented on a module 2318. The USB controllers 2326 and 2328 serve as hosts for peripheral controllers 2342(1) and 2342(2), a wireless adapter 2348, and an external memory device 2346 (e.g., Flash memory, external CD/DVD ROM drive, removable media, etc.). The network interface controller 2324 and/or wireless adapter 2348 provide access to a network (e.g., the Internet, home network, etc.) and may be any of a wide variety of various wired or wireless adapter components including an Ethernet card, a modem, a Bluetooth module, a cable modem, or the like.

System memory 2343 is provided to store application data that is loaded during the boot process. A media drive 2344 is provided and may comprise a DVD/CD drive, hard drive, or other removable media drive, etc. The media drive 2344 may be internal or external to the multimedia console 114. Application data may be accessed via the media drive 2344 for execution, playback, etc. by the multimedia console 114. The media drive 2344 is connected to the I/O controller 2320 via a bus, such as a Serial ATA bus or other high speed connection (e.g., IEEE 1394).

The system management controller 2322 provides a variety of service functions related to assuring availability of the multimedia console 114. The audio processing unit 2323 and an audio codec 2332 form a corresponding audio processing pipeline with high fidelity and stereo processing. Audio data is carried between the audio processing unit 2323 and the audio codec 2332 via a communication link. The audio processing pipeline outputs data to the A/V port 2340 for reproduction by an external audio player or device having audio capabilities.

The front panel I/O subassembly 2330 supports the functionality of the power button 2350 and the eject button 2352, as well as any LEDs (light emitting diodes) or other indicators exposed on the outer surface of the multimedia console 114. A system power supply module 2336 provides power to the components of the multimedia console 114. A fan 2338 cools the circuitry within the multimedia console 114.

The CPU 2301, GPU 2308, memory controller 2310, and various other components within the multimedia console 114 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 114 is powered ON, application data may be loaded from the system memory 2343 into memory 2312 and/or caches 2302 and 2304 and executed on the CPU 2301. The application may present a graphical user interface that provides a consistent user experience when navigating to different media types available on the multimedia console 114. In operation, applications and/or other media contained within the media drive 2344 may be launched or played from the media drive 2344 to provide additional functionalities to the multimedia console 114.

The multimedia console 114 may be operated as a standalone system by simply connecting the system to a television or other display. In this standalone mode, the multimedia console 114 allows one or more users to interact with the system, watch movies, or listen to music. However, with the integration of broadband connectivity made available through the network interface controller 2324 or the wireless adapter 2348, the multimedia console 114 may further be operated as a participant in a larger network community.

When the multimedia console 114 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 114 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2342(1) and 2342(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present enhanced interactive television experiences are now presented by way of illustration and not as an exhaustive list of all embodiments. An example includes a method for providing a dynamic program guide with real-time updates, comprising: identifying new content to a user; tagging new content to enable the user to consume the new content through a user interface (UI); identifying live content based on user authentication levels; tagging live content to enable the user to consume the live content through the UI; categorizing content areas into channels displayed on the UI; exposing a content bar that is configured for enabling the user to browse content in a preview state before choosing a focused state; and previewing live content in a summary state within a live tile that facilitates browsing by the user.

In another example, the method further includes dynamically organizing content, based on user authorization, against multiple services and preferences. In another example, the method further includes delivering live video content only to users who are authenticated against third party services and concealing the authentication from other users. In another example, the method further includes dynamically creating live video players within a feed of events that are conceptually aligned to that live video feed. In another example, the method further includes delivering data and video cards within a feed of events to create a timeline that facilitates the user's stronger understanding of a linear story. In another example, the method further includes providing persistent delivery of a video feed in a hero position that resides inside a UI framework to thereby create an always-on video network.

A further example includes a system for providing a TV companion application for partial attention with real-time updates, comprising: one or more processors including a graphics processing unit (GPU); and a memory device storing computer-readable instructions which, when executed by the one or more processors, perform a method comprising the steps of: determining which content is most relevant and urgent for a user when the user is in a partial attention state, receiving user interface dimensions from a user, modifying a user interface to fit different footprints based on the dimensions input from the user, the modifying including operating the GPU for splitting the user interface between a dominant content area and a secondary content area when in a companion mode, providing summary data at a top level of the companion mode that serves personalized user data, and adjusting timing and cadence of cycling of summary data shown in the companion application to service the partial attention state.

In another example, the system further comprises supporting a navigation model that enables the user to park in a detailed content feed which populates and updates in real-time with important data. In another example, the system further comprises implementing programmatic systems that process information from third parties against user preferences and tendencies into UI elements that enter a feed. In another example, the system further comprises applying animations, visual effects, and special effects that support the introduction of new content while the user is in a partial attention state. In another example, the system further comprises showing content in the form of cards. In another example, the cards include at least one of data, objects, graphics, or information which are organized by theme, genre, subject, or type.

A further example includes one or more computer readable memories storing computer-executable instructions for implementing system notifications, comprising: identifying key event triggers from a TV content provider and curating the key event triggers into a user experience; cataloging the events as they occur in real time, the cataloging comprising aggregating from an external data source or by using a human-directed service; identifying users needing a notification; intersecting interest levels of identified users with the cataloged events; and displaying an alert on a user interface (UI) regardless of activities in which a user is currently engaged.

In another example, the one or more computer readable memories further comprise enabling actioning on the alert to launch an application. In another example, the one or more computer readable memories further comprise enabling landing the user on a specific piece of content that is relevant to the alert. In another example, the one or more computer readable memories further comprise enabling the user to opt into and out of a specific alert type. In another example, the one or more computer readable memories further comprise intelligently curating alerts based on previous user decisions. In another example, the one or more computer readable memories further comprise including one or more deep links within the notification. In another example, the deep links are to user-specific application content. In another example, the one or more computer readable memories further comprise locating content based on the notification and sorting the content into a priority order based on notification type.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for providing a TV companion service for partial attention with real-time updates, comprising:
    one or more processors including a graphics processing unit (GPU); and a memory device storing computer-readable instructions which, when executed by the one or more processors, perform a method comprising the steps of:
operating an application within a dominant content area of a user interface;
while operating the application, receiving a notification associated with an application event, the notification providing a deep link for navigating to a location in a target application that corresponds to the application event;
using a deep link handler associated with the target application, locating content identified in the deep link;
sorting the content into a priority order based on the notification; and
landing the target application at a correct location within the sorted priority order.

2. The system of claim 1, further comprising
providing content displayed in a secondary content area, the content being selected from a dynamically curated feed of video and data elements that is customized to the user.

3. The system of claim 2 further comprising
supporting a navigation model that enables the user to park in a detailed content feed which populates and updates in real-time with important data.

4. The system of claim 2 further comprising
implementing programmatic systems that process information from third parties against user preferences and tendencies into UI elements that enter the dynamically curated feed.

5. The system of claim 2 further comprising:
applying animations, visual effects, and special effects that support the introduction of new content to the secondary content area while the user is in a partial attention state.

6. The system of claim 2 further comprising showing the content in the secondary content area in the form of cards, in which the cards include at least one of data, objects, graphics, or information which are organized by theme, genre, subject, or type.

* * * * *